(12) United States Patent
Totaro et al.

(10) Patent No.: US 9,991,772 B2
(45) Date of Patent: Jun. 5, 2018

(54) LOW AXIAL FORCE PERMANENT MAGNET MACHINE AND MAGNET ASSEMBLY FOR PERMANENT MAGNET MACHINE

(71) Applicant: Philip Totaro, Santa Barbara, CA (US)

(72) Inventors: Philip Totaro, Santa Barbara, CA (US); Fang Deng, Novi, MI (US); Daniel M. Saban, Northville, MI (US); Seong T. Lee, Lexington, KY (US); Murtuza Lokhandwalla, Canton, MI (US); Joel Hetrick, Ann Arbor, MI (US); Janne Kinnunen, Plymouth, MI (US)

(73) Assignee: Philip Totaro, Houston, TX (US)

(*) Notice: Subject to any disclaimer, the term of this patent is extended or adjusted under 35 U.S.C. 154(b) by 0 days. days.

(21) Appl. No.: 15/149,101

(22) Filed: May 7, 2016

(65) Prior Publication Data
US 2017/0040853 A1    Feb. 9, 2017

Related U.S. Application Data

(63) Continuation-in-part of application No. 13/558,984, filed on Jul. 26, 2012, which is a continuation-in-part of application No. 13/555,943, filed on Jul. 23, 2012.
(Continued)

(51) Int. Cl.
| | |
|---|---|
| *H02K 21/14* | (2006.01) |
| *H02K 29/03* | (2006.01) |
| *H02K 1/16* | (2006.01) |
| *H02K 1/27* | (2006.01) |
| *H02K 1/28* | (2006.01) |
| *H02K 21/22* | (2006.01) |
| *H02K 7/18* | (2006.01) |

(52) U.S. Cl.
CPC ........... *H02K 21/14* (2013.01); *H02K 1/16* (2013.01); *H02K 1/278* (2013.01); *H02K 1/28* (2013.01); *H02K 21/22* (2013.01); *H02K 29/03* (2013.01); *H02K 7/1838* (2013.01); *H02K 2201/06* (2013.01); *H02K 2213/03* (2013.01)

(58) Field of Classification Search
CPC .... H02K 2201/06; H02K 1/27–1/2793; H02K 1/28
USPC ......... 310/112, 114, 156.47, 156.25, 156.08, 310/216.073
IPC ................................................. H02K 1/27,1/28
See application file for complete search history.

(56) References Cited

U.S. PATENT DOCUMENTS

| | | | |
|---|---|---|---|
| 4,642,502 A * | 2/1987 | Carpenter | H02K 1/278 310/156.12 |
| 4,672,253 A | 6/1987 | Tajima et al. | |

(Continued)

FOREIGN PATENT DOCUMENTS

| | | | | |
|---|---|---|---|---|
| WO | WO 2005/093928 A1 | 10/2005 | | |
| WO | WO 2010072189 A1 * | 7/2010 | ........... | H02K 1/2753 |

*Primary Examiner* — Thomas Truong
(74) *Attorney, Agent, or Firm* — Eric L. Lane; Green Patent Law

(57) ABSTRACT

A rotor or stator hub for an electric machine includes a plurality of magnets arranged in a predetermined same pattern on a plurality of uniformly sized carrier plates. A plurality of permanent magnets are uniformly mounted on each of the carrier plates proximate a first edge of the carrier plate and spaced away from a second edge of the carrier plate. The carrier plates may be mounted on a rotor or stator hub in a predetermined configuration to create a plurality of axial array groups.

20 Claims, 29 Drawing Sheets

Related U.S. Application Data

(60) Provisional application No. 61/582,306, filed on Dec. 31, 2011, provisional application No. 61/582,311, filed on Dec. 31, 2011.

(56) References Cited

U.S. PATENT DOCUMENTS

| | | |
|---|---|---|
| 5,173,651 A | 12/1992 | Buckley et al. |
| 5,175,461 A | 12/1992 | Zigler |
| 5,760,520 A | 6/1998 | Hasebe et al. |
| 5,773,908 A | 6/1998 | Stephens |
| 6,628,034 B2 | 9/2003 | Jang et al. |
| 6,864,612 B1 | 3/2005 | Gotoh |
| 7,405,503 B2 | 7/2008 | Aoyama |
| 7,750,522 B2 | 7/2010 | Gizaw et al. |
| 8,593,029 B2 | 11/2013 | Inoue |
| 8,598,760 B2 | 12/2013 | Kurronen |
| 8,648,511 B2 | 2/2014 | Booth et al. |
| 2004/0189129 A1 | 2/2004 | Takahashi et al. |
| 2004/0090135 A1 | 5/2004 | Maslov et al. |
| 2007/0205689 A1 | 9/2007 | Nemoto |
| 2009/0224627 A1 | 9/2009 | Hino et al. |
| 2010/0277026 A1 | 11/2010 | Yamaguchi et al. |
| 2011/0175480 A1* | 7/2011 | Booth .................. H02K 1/278 310/156.13 |
| 2011/0248592 A1* | 10/2011 | Siegfriedsen ........ H02K 1/2753 310/156.08 |

* cited by examiner

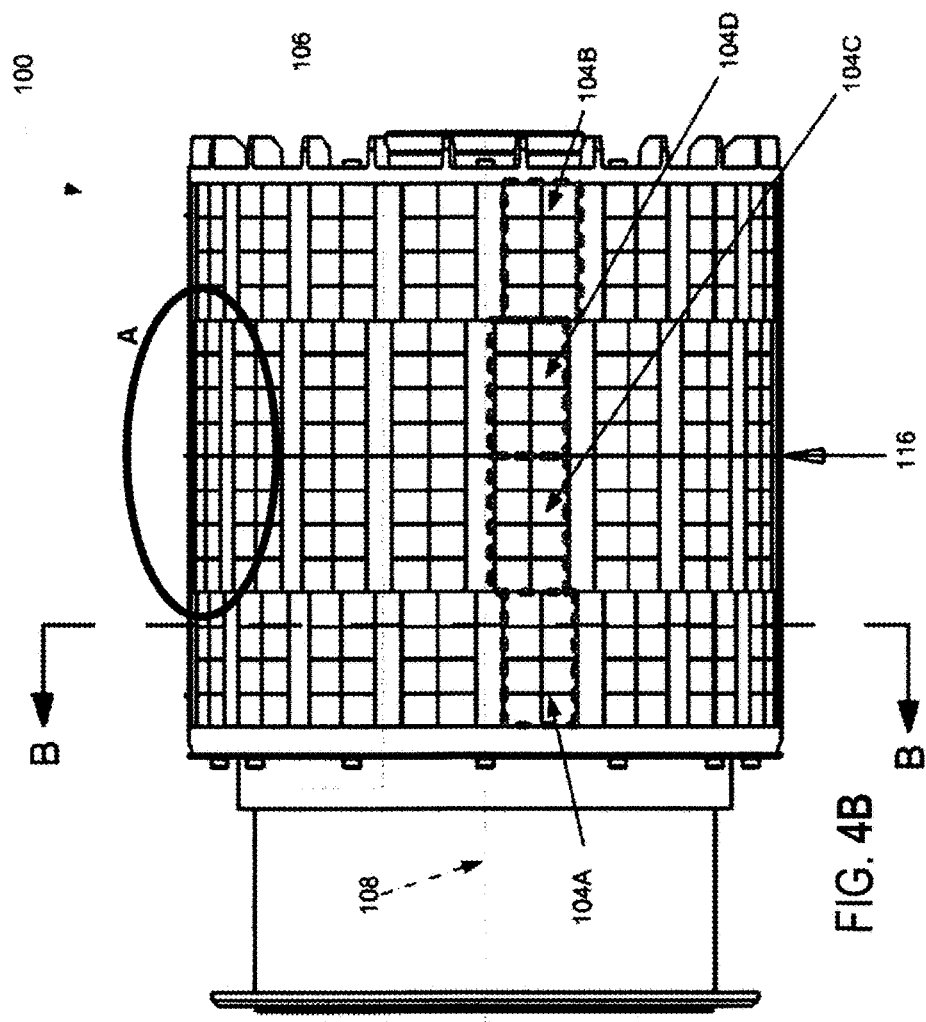

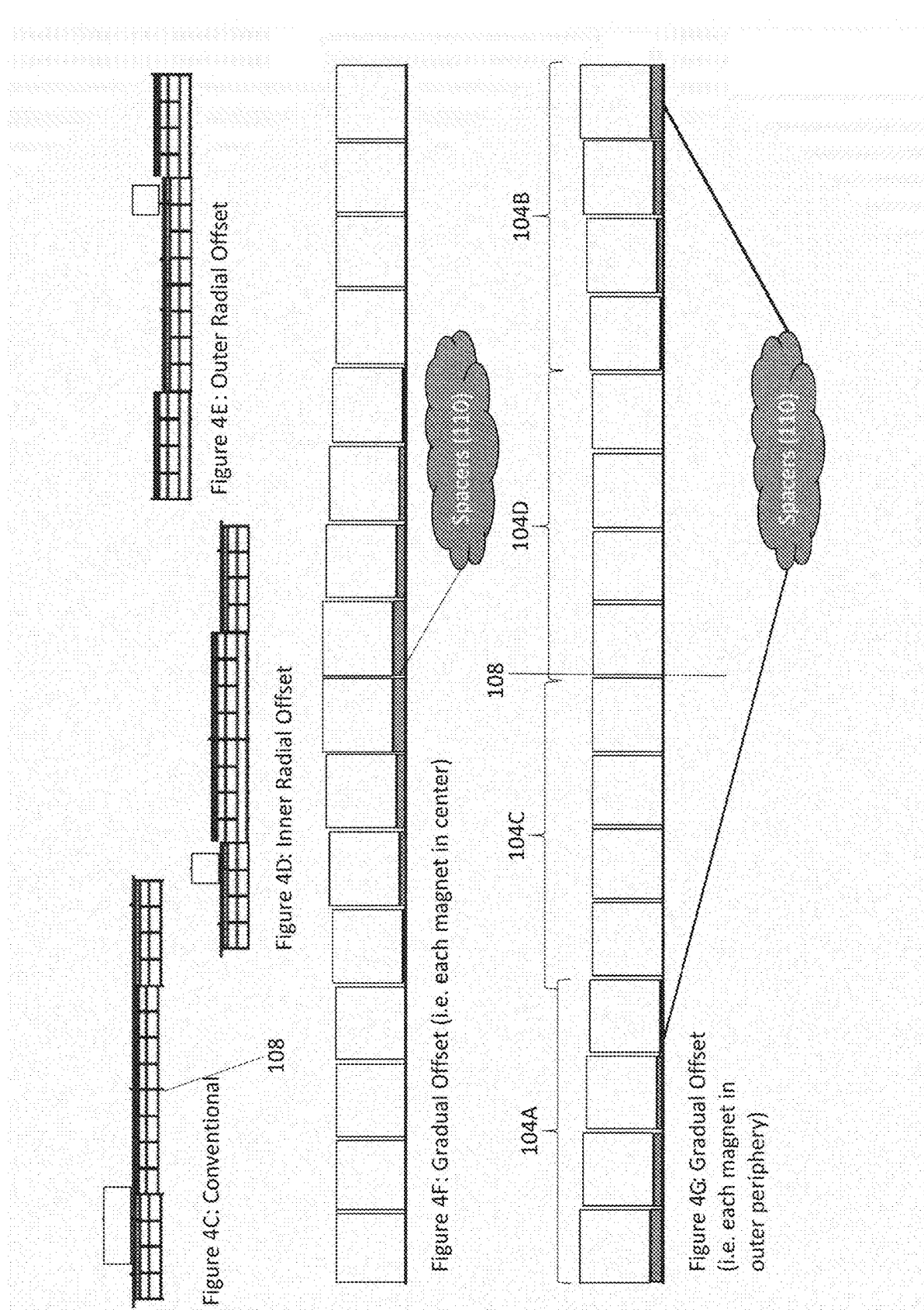

LOW AXIAL FORCE PERMANENT MAGNET MACHINE AND MAGNET ASSEMBLY FOR PERMANENT MAGNET MACHINE

CROSS-REFERENCE TO RELATED APPLICATIONS

This application is a continuation-in-part of and claims priority to U.S. patent application Ser. No. 13/555,943, filed Jul. 23, 2012, which is a non-provisional of and claims priority to U.S. Provisional Application No. 61/582,311, filed Dec. 31, 2011, each of which is hereby incorporated by reference in its entirety. This application is a continuation-in-part of and claims priority to U.S. patent application Ser. No. 13/558,984, filed Jul. 26, 2012, which is a non-provisional of and claims priority to U.S. Provisional Application No. 61/582,306, filed Dec. 31, 2011, each of which is hereby incorporated by reference in its entirety.

BACKGROUND

1. Technical Field

The present disclosure relates to a permanent magnet machine, and more specifically to a magnet assembly of a permanent magnet machine. The present disclosure further relates to a winding configuration and a magnet configuration of a permanent magnet machine.

2. Related Art

Permanent magnet machines include motors and generators. Instead of a field winding (typically on the rotor) to which electricity is applied to produce a magnetic field, permanent magnet machines can use permanent magnets to provide the magnetic field. Permanent magnet generators can use a permanent magnet instead of a field coil winding to produce the magnetic field of the rotor. Permanent magnet motors can use permanent magnets on the rotor instead of a field winding to produce a magnet field on the rotor. Torque, on both motors and generators is a function of the resultant field.

SUMMARY

An electric machine includes an armature having a plurality of teeth separated by slot openings, each of the teeth having at least one bifurcation. The wound armature may be included as part of a stator or a rotor. The electric machine may also include a main field having a plurality of permanent magnets. The permanent magnets may be arranged to form axial array groups on the main field of either the rotor or the stator of the electric machine. The permanent magnets in each of the axial array groups may be positioned with respect to each other based on the position of the teeth bifurcations and the slot openings.

An electric machine may include a plurality of permanent magnets uniformly mounted on respective carrier plates. The carrier plates may be uniform in size and shape. A group of the magnets may be similar positioned on a surface of each of the carrier plates to be near a first edge of a respective carrier plate, and spaced away from a second edge of the respective carrier plate. The group of magnets may be spaced away from the second edge to form a step offset on the surface of the respective carrier plates. The carrier plates may be arranged sequentially to align a common central axis of the carrier plates and form axial array groups on either the rotor or the stator of the electric machine.

The carrier plates may all have a common central axis. A first carrier plate may be positioned sequentially with a second carrier plate on a hub, such as a rotor or stator hub to align the common central axes of the carrier plates in parallel with an axial centerline of the electric machine. A first array of magnets may be coupled with the first carrier plate in a predetermined offset position from the common central axis to form a step offset on the surface of the first carrier plate. The first carrier plate may be positioned to have the first array of magnets in a first orientation on the stator or rotor hub. A second array of magnets may be coupled with the second carrier plate in substantially the same predetermined offset position since all the carrier plates are uniformly dimensioned. The second carrier plate may be positioned on the hub to have the second array of magnets in a second orientation, where the first orientation is opposite the second orientation.

The surface of the hub to which the carrier plates are coupled may be round or may be faceted. The carrier plates may be formed to accommodate the surface of the hub. For example, the carrier plates may be dimensioned to fit on a respective faceted surface of the hub, or a surface of the carrier plates opposite the magnets may be curved with a predetermined radius of curvature to conform to the contour of the round surface of the hub. In addition, or alternatively, the surface of the carrier plates upon which the magnets are mounted may be beveled to create a substantially rounded outer surface of the hub when the carrier plates are installed.

The electric machine may include a rotor and a stator. The axial group array may include a first magnet, a second magnet, a third magnet and a fourth magnet. The axial group array may be positioned symmetrically on the main field about a first axis of the electric machine that is parallel with an axial centerline of the electric machine. The first magnet and the second magnet may be positioned along a second axis parallel with the axial centerline of the electric machine so that the third magnet and the fourth magnet are at least partially positioned therebetween. The third magnet and the fourth magnet may be positioned along a third axis parallel with the axial centerline of the electric machine. The first axis, the second axis, and the third axis may all be different locations on the main field.

The magnets may be mounted to form arrays on the carrier plates. Some of the magnets included in the arrays may be of varying lengths to provide a substantially uniform cylindrical outer surface when the carrier plates are mounted on the hub. Alternatively, or in addition, at least part of a surface of the magnets opposite the carrier plate may be beveled to provide a substantially uniform cylindrical surface when the carrier plates are mounted on the hub. For example, corners of some of the magnets in some of the magnet arrays included on the carrier plates may be beveled.

The electric machine may include bifurcated teeth positioned circumferentially on the armature of one of the rotor or the stator to form a plurality of slots. Each of the bifurcated teeth may include at least one bifurcation. The magnets may be positioned axially on the main field to form an axial array group along a center step axis that is parallel to an axial centerline of the electric machine. A first group of the plurality of magnets may be offset from the center step axis in a first direction, and a second group of the plurality of magnets may be offset from the center step axis in an opposite direction. The offset of the first and second groups of magnets may be based on a relative position of the bifurcated teeth and the slots with respect to the first and second groups of magnets.

Exemplary embodiments of the electric machine include the mounting of the magnets on respective carrier plates that are positioned on the electric machine. The carrier plates may be of uniform dimensions, and the magnets may be mounted in a same predetermined position on respective carrier plates. The respective carrier plates are rotatable between a first position and a second position on the main field of the electric machine. The carrier plates are rotatable to the first position to align the magnet(s) on the respective carrier plate with a first axis, and are rotatable to the second position to align the magnet(s) with a second axis. The first and second axes may be parallel with the axial centerline of the machine, and may be spaced apart from each other by a predetermined distance defined with a step offset. The step offset may be determined based on the relative location of the bifurcated teeth and the slots with respect to the magnets.

Exemplary embodiments include the use of magnet pole arrays to form the axial array groups positioned on the main field of the electric machine. The magnet pole arrays may be formed on the carrier plates. The magnet pole arrays in an axial array group may be step offset from one another to form a multi-step configuration. The step offset may be based on a step angle determined from the bifurcation angles and slot angles included in the machine. The step angle may be based on a first plane intersecting the first axis and the axial centerline and a second plane intersecting the second axis and the axial centerline to form a predetermined angle.

The carrier plates can be arranged to also offer step offset in the radial direction for the magnet pole arrays. This type of radial offset provides the electric machine with the ability to maintain efficiency while accommodating longitudinal displacement due to off-axis loading in the axial direction. While it would be necessary to increase the air gap to accommodate the radial offset, this type of radial offset can prevent magnets in the arrays located in the in the interior or outer periphery of the rotor assembly from physically contacting the stator assembly. The radial offset ensures that the electric machine efficiency losses are minimized during the occurrences of axial displacement.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention.

FIG. 4B is a side view of an example rotor hub of a permanent magnet machine.

FIG. 4C is a perspective schematic view of the rotor hub illustrated in FIG. 4B.

FIG. 4D is a perspective schematic view of the rotor hub illustrated in FIG. 4B.

FIG. 4E is a perspective schematic view of the rotor hub illustrated in FIG. 4B.

FIG. 4F is a perspective schematic view of the rotor hub illustrated in FIG. 4B.

FIG. 4G is a perspective schematic view of the rotor hub illustrated in FIG. 4B.

DETAILED DESCRIPTION

Figure 1:
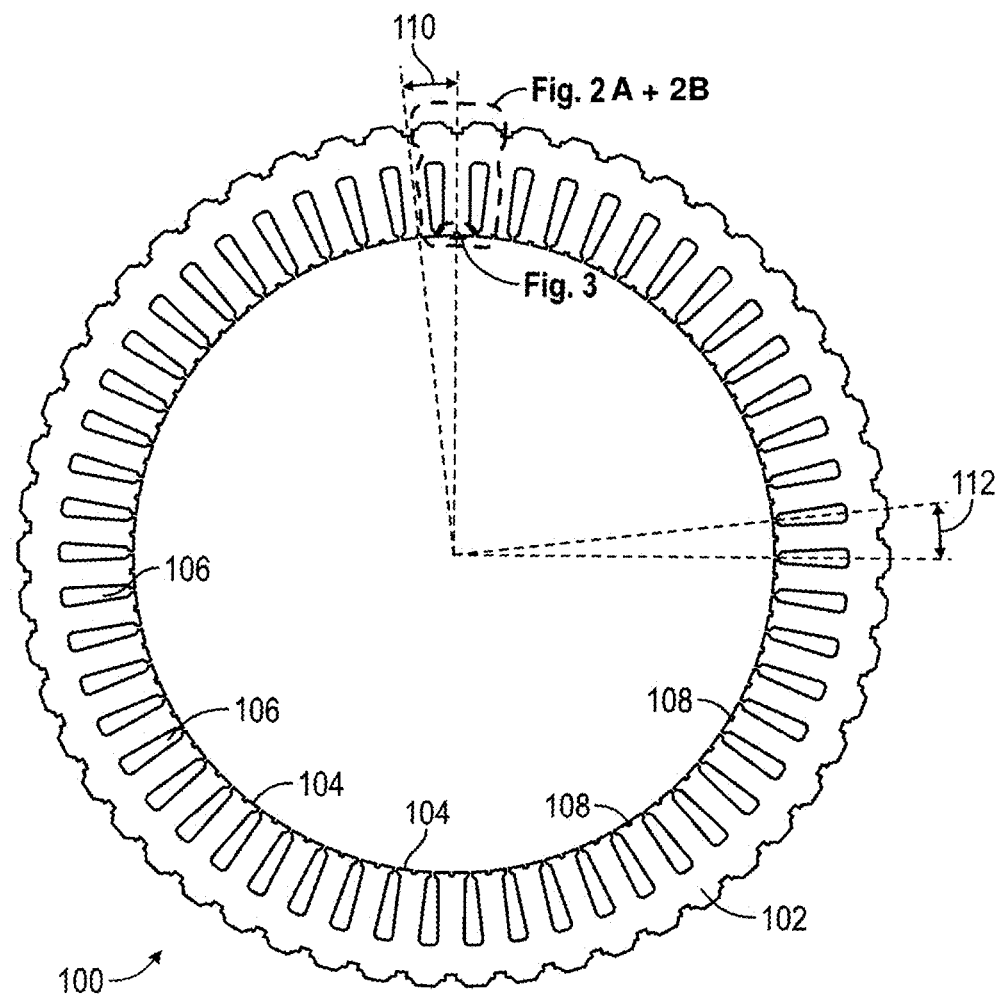
FIG. 1 is a cut-away side view of an example armature of a permanent magnet machine.

Permanent magnet (PM) synchronous machines can include a stationary armature, such as on a stator surrounding a rotating main field, such as on a rotor. In other examples, the armature could be surrounded by the rotor. An example permanent magnet synchronous machine is a generator for use in a wind turbine application, or a motor used to produce torque. The stator or the rotor can include a plurality of main windings having a number of poles formed in the stator or rotor core. The rotor is a rotatable hub positioned within the stator in close proximity to the main windings.

The rotor or stator hub may include one or more permanent magnets. The magnets may be ferrite, alnico, rare earth magnets such as neodymium-iron-boron magnets or samarium-cobalt magnets, or any other magnetic material having sufficient magnet field for use in a particular electric machine. The magnets may be disposed on the hub to be aligned in a predetermined position with respect to each other and with respect to the main windings.

In one example, the magnets may be grouped in arrays of magnets forming a magnet pole array. The term "magnet pole array" denotes that the array is comprised of magnets with a predetermined dipole orientation. Thus, the magnets may be arranged to have like magnetic dipole orientation, or may be arranged to not have like magnetic pole orientation. For example, the magnets may be magnetized as uniform parallel magnets with parallel lines of flux between the north and south poles of each magnet that are perpendicular to the north and south faces of a respective magnet. Alternatively, or in addition, the magnets may be magnetized as radial magnets in which the lines of flux radially extend through the respective magnets such that the lines of flux are not perpendicular to the north and south faces.

The magnets may be grouped in arrays of magnets for ease of handling during manufacturing. Ease of handling involves the ease of carrying and holding the individual magnets during the electric machine manufacturing process. In addition, grouping of magnets may be preformed to meet a desired magnet flux density in view of magnet size manufacturing constraints, such as mold size, that limit the overall size of the individual single piece magnets. In addition, arrays that include multiple magnets may minimize eddy current both axially along an axial centerline of the main field, and circumferentially around the main field by increasing the impedance of the eddy current path, for example by placing an electrical insulator or physical separator between otherwise contiguously positioned magnets in a magnet array. Different sizing of the array of magnets may have varying degrees of impact on the minimization of eddy currents. For example, in the configuration of FIG. 1, each magnetic pole array may operate with the least amount of eddy currents when compared to a single large magnet.

Each magnet pole array may be positioned in a predetermined position with respect to other magnet pole arrays included on the hub. The magnet pole arrays may be formed in axial array groups each including a predetermined number of magnet pole arrays. The axial array groups may extend in an axial direction parallel with the shaft of the permanent magnet machine from a first end of the hub surface to a second end of the hub surface. Each of the axial array groups may be positioned on the surface of the hub with respect to each other to form a substantially contiguous magnetic surface concentrically surrounding the hub. As used herein, the term "hub" refers to the rotor or stator having magnets positioned thereon. Although the term "rotor hub" or "rotor" is used herein, these terms should be considered as interchangeable with "stator hub."

FIG. 1 is an example of an armature 100 that may be included on a rotor or a stator of an electric machine. In FIG. 1, the armature 100 is formed to surround the rotor, however in other examples, the armature could be surrounded by the rotor. The armature 100 includes a plurality of main windings having a number of poles formed in an armature core 102 of the armature 100. The armature core 102 can be formed from a stack of laminations. Each of the laminations in the armature core 102 may be formed to include a plurality of radially extending members separated from each other by apertures. When the laminations are stacked, the radially extending members in corresponding laminations are combined to form armature teeth 104, and the corresponding apertures form slots 106 within which the main windings are positioned. In other examples, the armature core configuration described may be included in a permanent magnet (PM) synchronous machine.

By varying the length of individual laminations in an armature tooth 104, one or more bifurcations 108, or notches, may be formed in each of the armature teeth. Thus, a tooth bifurcation may be present every "x" number of degrees around the armature 100, forming a predetermined bifurcation angle 110 between adjacently positioned armature teeth 104. In FIG. 1, the bifurcation angle 110 formed between tooth bifurcations 108 on adjacent armature teeth 104 is illustrated. In one example, the armature 100 may be a stator that includes fifty-four armature teeth 104, such as stator teeth, with fifty-four corresponding tooth bifurcations 108 spaced apart by about 6.54 degrees. A similar angle also exists between each slot 106, which may be referred to as a slot pitch angle 112, which is measured between adjacently positioned slot openings of the respective slots 106. The corresponding totality of the combination of the angles between the bifurcations 108 and slots 106 may be referred to as slot/bifurcation (SB) angles.

In the example armature 100 of FIG. 1, the SB angles, which are the angles between each slot 106 and each bifurcation 108 is about 3.27 degrees. In other examples, any other bifurcation angles 110, slot pitch angles 112, and SB angles may be used to position the slots 106, armature teeth 104, and corresponding bifurcations 108. For example, if there is one bifurcation 108 in an armature tooth 104, than the angle between a slot opening of a slot 106 and the bifurcation 108 (the SB angle) is one half of the slot pitch angle 112. In the example of two bifurcations 108 in each armature tooth 104, the SB angle would be one third of the slot pitch angle 112.

Figure 2A:
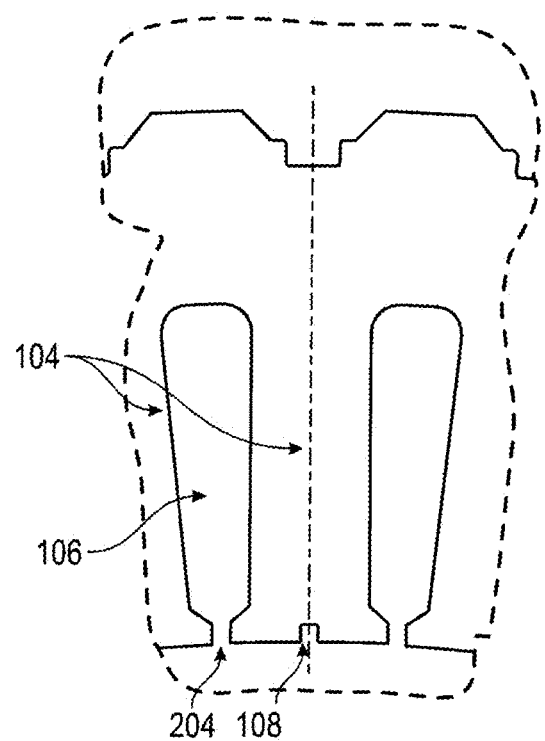
FIG. 2A is a more detailed view of a portion of the armature illustrated in FIG. 1 that depicts examples of armature teeth and armature slots.
Figure 2B:
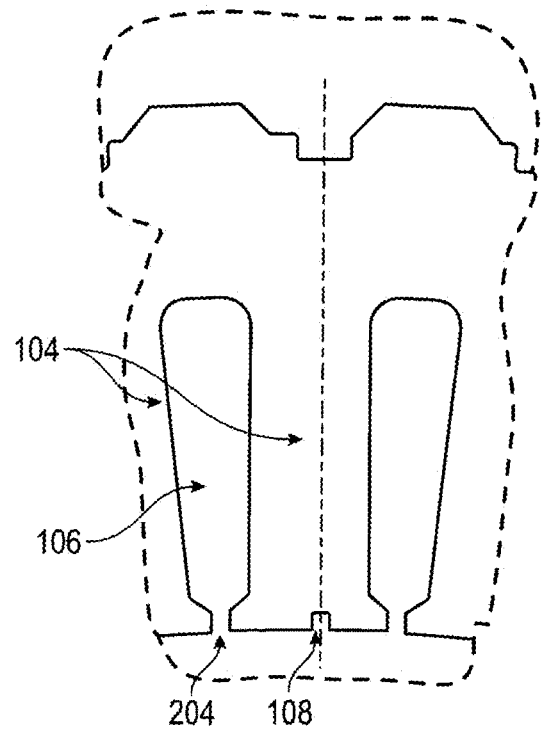
FIG. 2B is a more detailed view of a portion of the armature illustrated in FIG. 1 that depicts examples of armature teeth and armature slots.

FIGS. 2A and 2B are example portions of the armature 100 illustrated in FIG. 1 depicting armature teeth 104 and slots 106. The armature 100 of FIG. 2 could be a portion of a rotor or a stator of an electric machine, but generally may form part of the stator of an electric machine. The bifurcations 108 in the armature teeth 104 may be a predetermined depth and a predetermined width, and corresponding slot openings 202 may be a predetermined size. The predetermined depth and the predetermined width of the bifurcations 108 may be determined in accordance with the predetermined size of the slot openings 202. For example, a ratio between the size of the slot openings 202 and the depth and/or width of the bifurcations 108 may be used. The bifurcations 108 appear to the main field as additional slot openings 202, which results in less tooth ripple flux penetrating into the main field. For example, in the case of one bifurcation being present in each armature tooth 104, the number of slots 106 from the perspective of the main winding may be effectively doubled and the amplitude of the tooth ripple flux may be halved. In other examples, the dimensions and shape of the bifurcations 108, such as the width, depth and height may be determined by any other technique to develop bifurcations that mimic slot openings 202 during operation of the electric machine.

Tooth ripple flux may create two effects that result in lower performance: 1. Torque ripple may be created by tooth ripple flux. Torque ripple creates undesirable mechanical forces which can be transferred to the machine shaft and connected equipment; and 2. Main field eddy currents caused by tooth ripple flux may result in higher losses in the magnets and monolithic conducting components of the main field, lowering efficiency and possibly increasing the temperature of the magnets which will tend to lower the useful magnetic flux produced by the magnets. The multi-stepped configuration may effectively operate as a filter, such as a "notch filter" to minimize tooth ripple flux in predetermined harmonics, such as the 17th or 19th harmonic and effectively "tune" the air gap between the armature and the main field to decrease asynchronous magnetic flux and thereby torque ripple. The interaction between the slot opening, tooth bifurcation, and the step offset may be used to effectively minimize torque ripple by applying a filtering effect to the tooth ripple flux. Thus, the tooth ripple flux and main field eddy currents may be minimized in a desired way, such as by filtering only harmonics of interest, and overall performance of the electric machine may be increased.

Figure 3A:
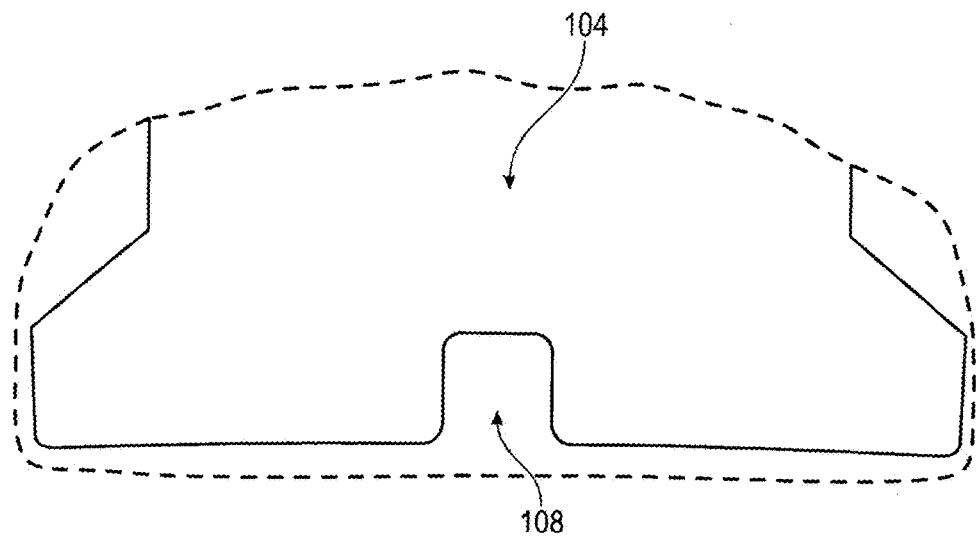
FIG. 3A is a more detailed view of a portion of a bifurcated armature tooth, such as one of the armature teeth illustrated in FIGS. 1, 2A, and 2B.
Figure 3B:
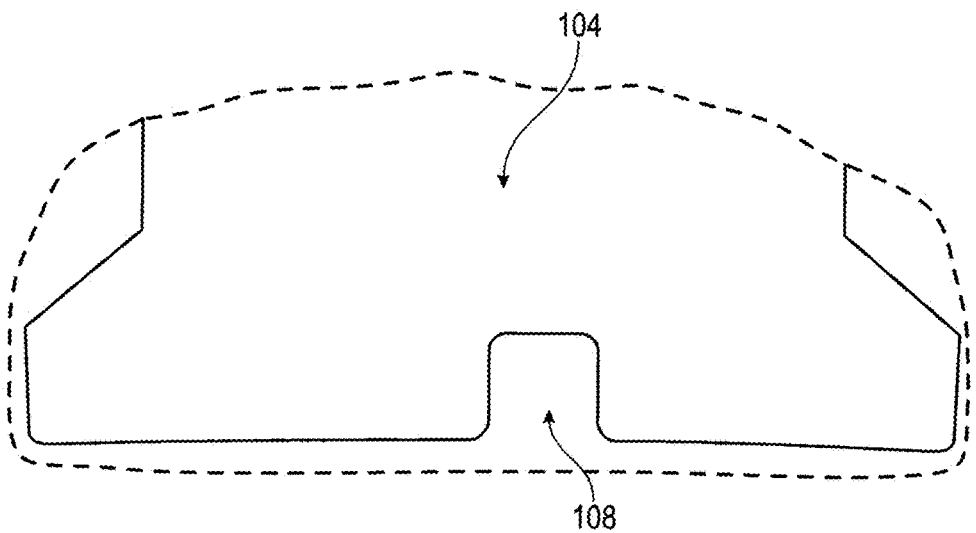
FIG. 3B is a more detailed view of a portion of a bifurcated armature tooth, such as one of the armature teeth illustrated in FIGS. 1, 2A, and 2B.

FIGS. 3A and 3B are illustrations of a portion of example bifurcated armature teeth 104 such as one of the armature teeth 104 illustrated in FIGS. 1, 2A, and 3B. In the illustrated examples of FIGS. 2A-2B and 3A-3B, the slot opening size may be 3.5 millimeters, and the width and depth of the bifurcations 108 formed in each of the armature teeth 104 may be equal, such as 3.5 millimeters deep, and 3.5 millimeters wide. (see FIG. 3A) In other examples, the width and depth of the bifurcations 108 may be different from the size of the slot openings 202, or the width and depth of the bifurcations 108 may be different among different armature teeth 104. In addition, ratios other than a one-to-one ratio may be used between the size of the slot openings 202 and the width and/or depth of the bifurcations 108.

The bifurcations 108 may be in the same relative position on each of the armature teeth 104, such as centered in the armature teeth 104 between the slot openings 202. Accordingly, the bifurcations 108 may be evenly spaced around the armature 100 with respect to each other, and have equal bifurcation angles 110. Alternatively, each of the armature teeth 104 may have two bifurcations 108 that are equally spaced across the respective armature tooth 104. In this configuration, the bifurcation angle 110 between two bifurcations 108 on the same armature tooth 104 may be different than the bifurcation angles 110 between adjacently positioned bifurcations 108 that are formed in different armature teeth 104. The SB angles may be equal and uniform around the armature 100, since the angles between the bifurcations 108 on a respective armature tooth 104, and the angles between the bifurcations 108 and the adjacently positioned armature slots 106 may be equal in order to present uniformly appearing "slots" from the perspective of the main winding. Alternatively, the bifurcation angles 110 may all be substantially or partially non-uniform.

In another alternative example, the bifurcations 108 may be selectively offset from a center 202 of a respective armature tooth 104 such that the bifurcations 108 may be closer to one adjacently located armature slot opening 202 and further from a second adjacently located armature slot opening 202. In this example configuration, the corresponding bifurcation angles 110 may similarly vary, along with the SB angles, which are the angles between the bifurcations 108 and between the bifurcations 108 and the slot openings 202. Thus, the locations of the bifurcations 108 in the armature teeth 104 may be non-uniform with respect to each other, or there may be groups of armature teeth 104 with substantially the same location of the one or more bifurcations 108. Accordingly, the bifurcation angles 110 and the slot pitch angles 112 between the slot openings 204 and the bifurcations 108 may be non-uniform resulting in non-uniform SB angles. Offset or unequally distributed bifurcations 108 can serve to create a separate set (or sets) of tooth ripple flux harmonics; varying widths of bifurcations 108 can also change the tooth ripple flux signature. The result of the unequally distributed bifurcations 108 can be to distribute the total tooth ripple flux harmonic energy across multiple harmonics, not all in-phase with each other. These are secondary tuning techniques that can be combined with magnet edge or pole shaping to optimize a particular desired harmonic filtering effect.

Figure 4A:
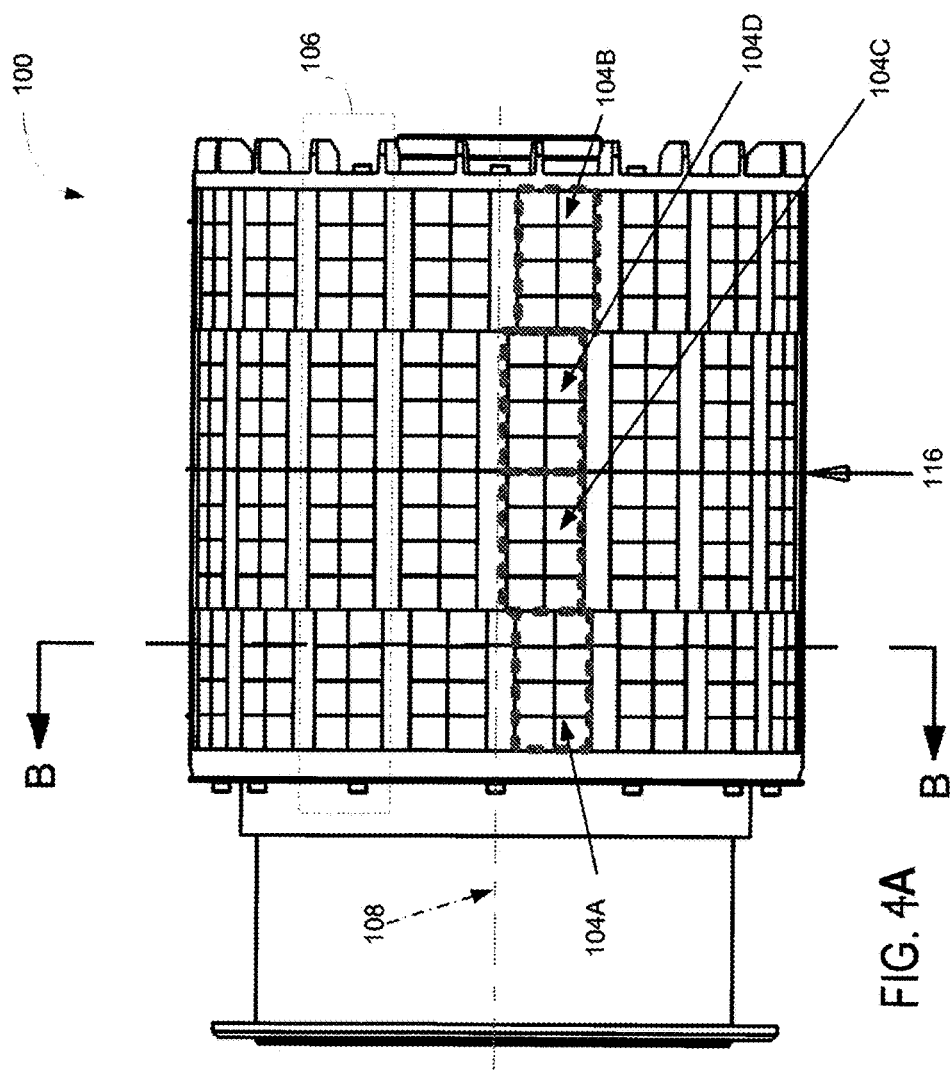
FIG. 4A is a side view of an example rotor hub of a permanent magnet machine.

FIG. 4A is a side view of an example rotor hub 100, or yoke, or inner rotor, of a permanent magnet machine having a main field that can be surrounded by an armature. In other examples, the rotor hub 100 could be a stator hub of a permanent magnet machine. The rotor hub 100 may include one or more permanent magnets 102. The magnets 102 may be single magnets, or groups of similarly aligned magnets formed of ferrite, alnico, rare earth magnets such as neodymium-iron-boron magnets or samarium-cobalt magnets, or any other magnetic material having sufficient magnet field for use in a particular electric machine. The magnets 102 may be disposed on an outer surface of the rotor hub 100 to be aligned in a predetermined position with respect to each other and with respect to the stator teeth.

In one example, the magnets may be grouped in arrays of magnets forming a magnet pole array 104. The term "magnet pole array" denotes that the array is comprised of magnets with like magnetic dipole orientation. Each magnet pole array 104 may be positioned in a predetermined position with respect to other magnet pole arrays 104 included on the rotor hub 100. The magnet pole arrays 104 may be formed in axial array groups 106 each including a predetermined number of magnet pole arrays 104. The axial array groups 406 each including a predetermined number of magnet pole arrays 404. The axial array groups 406106 may extend in an axial direction parallel with a shaft of the rotor hub 100 positioned along an axial centerline 108 of the rotor hub 100. The axial array groups 106 may be positioned on the surface of the rotor hub 100 so as to extend from a first end 110 of the rotor surface to a second end 112 of the hub surface. Each of the axial array groups 106 may be positioned on the outer surface of the rotor hub 100 with respect to each other to form a substantially contiguous magnetic surface concentrically surrounding the rotor hub 100. In one example, the rotor hub 100 may be part of a permanent magnet synchronous machine used as a generator for wind turbine applications. In other examples, the described configuration of the rotor hub 100 may be included as a stator hub of a permanent magnet induction machine.

In the example rotor hub 100 of FIG. 4A, there are four horizontal magnet pole arrays 104 sequentially positioned along the axial centerline 108 and forming each of the axial array groups 106. In FIG. 4A, an axial array group 106 is identified in a dotted lines box, in which each of four different magnet pole arrays 104 included in the axial array group 106 are identified with dotted lines. The four horizontal axial array groups 106, which include arrays of magnets forming the axial array group 106 are identified in FIG. 4A as a left outer magnet pole array 104A, a right outer magnet pole array 104B, a left central magnet pole array 104C and a right central magnet pole array 104D. In other examples, any number of magnet pole arrays 104 of any size may be used to form axial array groups 106 on the surface of the rotor hub 100. Alternatively, single or multiple magnets may be used in place of an array of magnets within the axial array groups 106.

In other exemplary embodiments, shown in of FIGS. 4A-4G, the four horizontal magnet pole arrays 104A-D may comprise offsets in the radial direction. FIG. 4C shows a conventional arrangement with no radial offset of any of the magnet pole arrays 104. FIG. 4D shows an arrangement in which the inner-most magnet pole arrays 104C and 104D are offset in the radial direction. FIG. 4E shows an arrangement in which the outer-most magnet pole arrays 104A and 104B are offset in the radial direction. FIG. 4F shows an arrangement in which the individual magnets 102 on the magnet pole arrays 104C and 104D comprise step offsets in the radial direction which are balanced on either side of the electric machine centerline 108. FIG. 4G shows an arrangement in which the individual magnets 102 on the magnet pole arrays 104A and 104B comprise step offsets in the radial direction which are balanced on either side of the electric machine centerline 108. The type and location of the radial offset used would depend on whether the electric machine was mounted on central bearings or bearings on the outer periphery.

Spacers 110 mounted to the carrier plates can be used to provide the offset in the radial direction for the individual magnets 102 or the magnet pole arrays 104 of the axial array groups 106. Spacers 110 should be ideally sized between 0.5 mm to 10.0 mm in height and can comprise a magnetically permeable or non-permeable material. Spacers 110 can be operatively sized to optimize or tune the efficiency losses of the electric machine. Ideally, radial offsets are balanced on either side of the centerline of the electric machine, so as to maintain axial force balance. However, radial offsets can also be used to correct manufacturing defects or known overhanging moments which affect one side of the electric machine.

Figure 5:
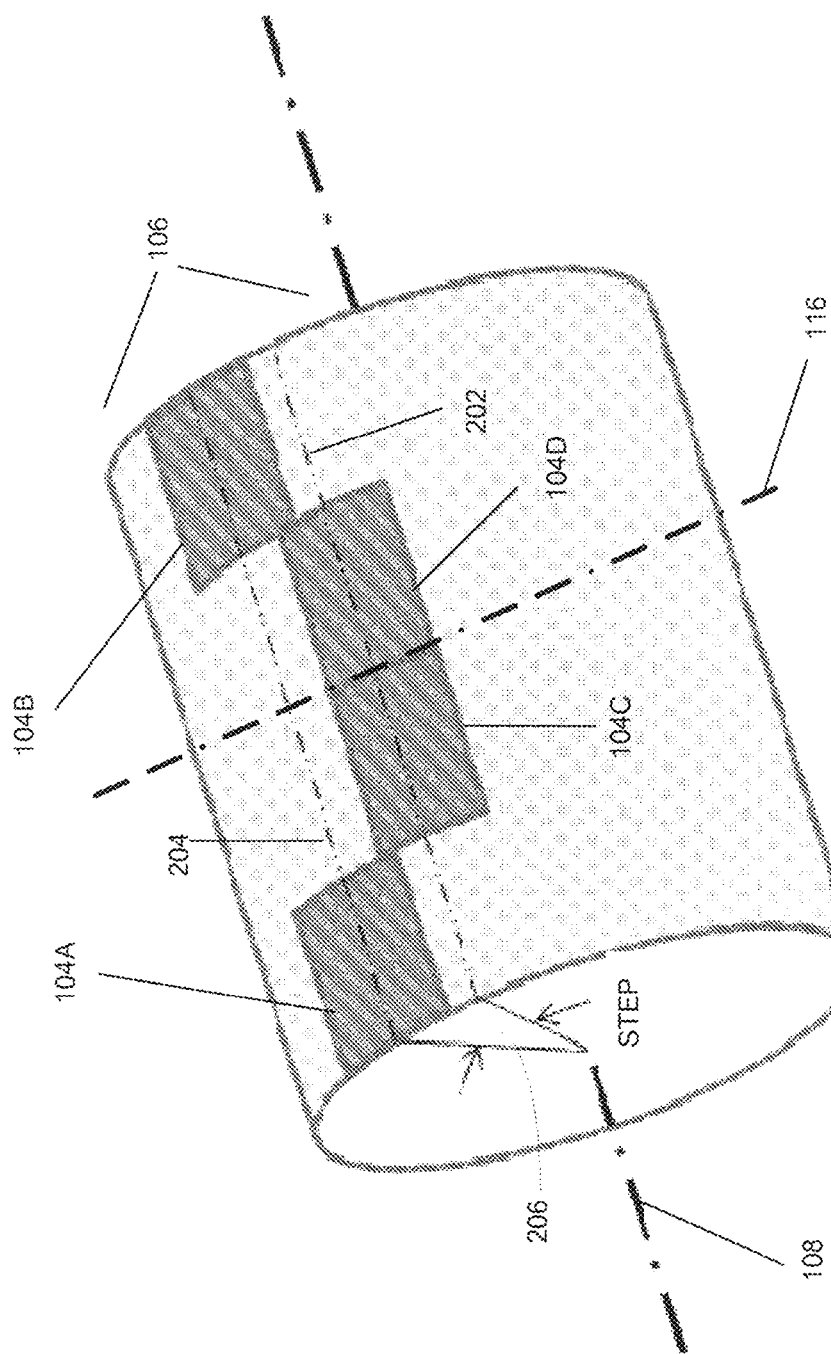
FIG. 5 is a perspective schematic view of the rotor hub illustrated in FIG. 4A.

FIG. 5 is an example configuration of an axial array group 106 that may be included on the example rotor hub 100 of FIG. 4A, or on an example stator hub in other examples. Within each of the axial array groups 106, the central magnet pole arrays 104C and 104D may be considered a first group of magnet pole arrays that are positioned on the rotor 100 with respect to the outer magnet pole arrays 104A and 104B formed as a second group of magnetic pole arrays. Each of the first and second groups of magnet pole arrays may be sequentially arranged along a different axis that lies parallel with the axial centerline 108 of the machine.

In FIG. 5, the first group of magnet pole arrays is positioned along a first axis 202, and the second group of magnet pole arrays is positioned along a second array axis 204. The first and second array axes 202 and 204 are parallel to the axial centerline 108, and are at different locations around the circumference of the rotor hub. The first and second array axes 202 and 204 may be along the magnetic center or mechanical center of the magnetic pole arrays 104. Accordingly, each of the central magnet pole arrays 104C and 104D may be symmetrically aligned with the first array axis 202, and each of the outer magnet pole arrays 104A and 104B may be symmetrically aligned with the second array axis 204. Thus, in the illustrated example, the left central magnet pole array 104C and the right central magnet pole array 104D are substantially aligned so as to be symmetric about the first array axis 202, and the left outer magnet pole array 104A and the right outer magnet pole array 104B are substantially aligned so as to be symmetric about the second array axis 204. In other examples, the first array axis 202 and the second array axis 204 may be along an edge of the magnetic pole arrays 104 in the respective first group of magnet pole arrays and the second group of magnet pole arrays, or any other location that provides uniform axes of the different arrays. The first array axis 202 and the second array axis 204 are in different planes that are separated on the surface of the rotor hub by a step angle 206 and intersect to form the axial centerline 108.

In the example configuration, the two outer magnet pole arrays 104A and 104B are offset, or stepped, in the same direction, by about the same amount with respect to the two central magnet pole arrays 104C and 104D. This may be referred to as a "multi-stepped" configuration. The examples of FIGS. 4A and 5 may also be referred to as a "double stepped" configuration, or a "¼-½-¼ step(ped)" configuration.

Figure 6:
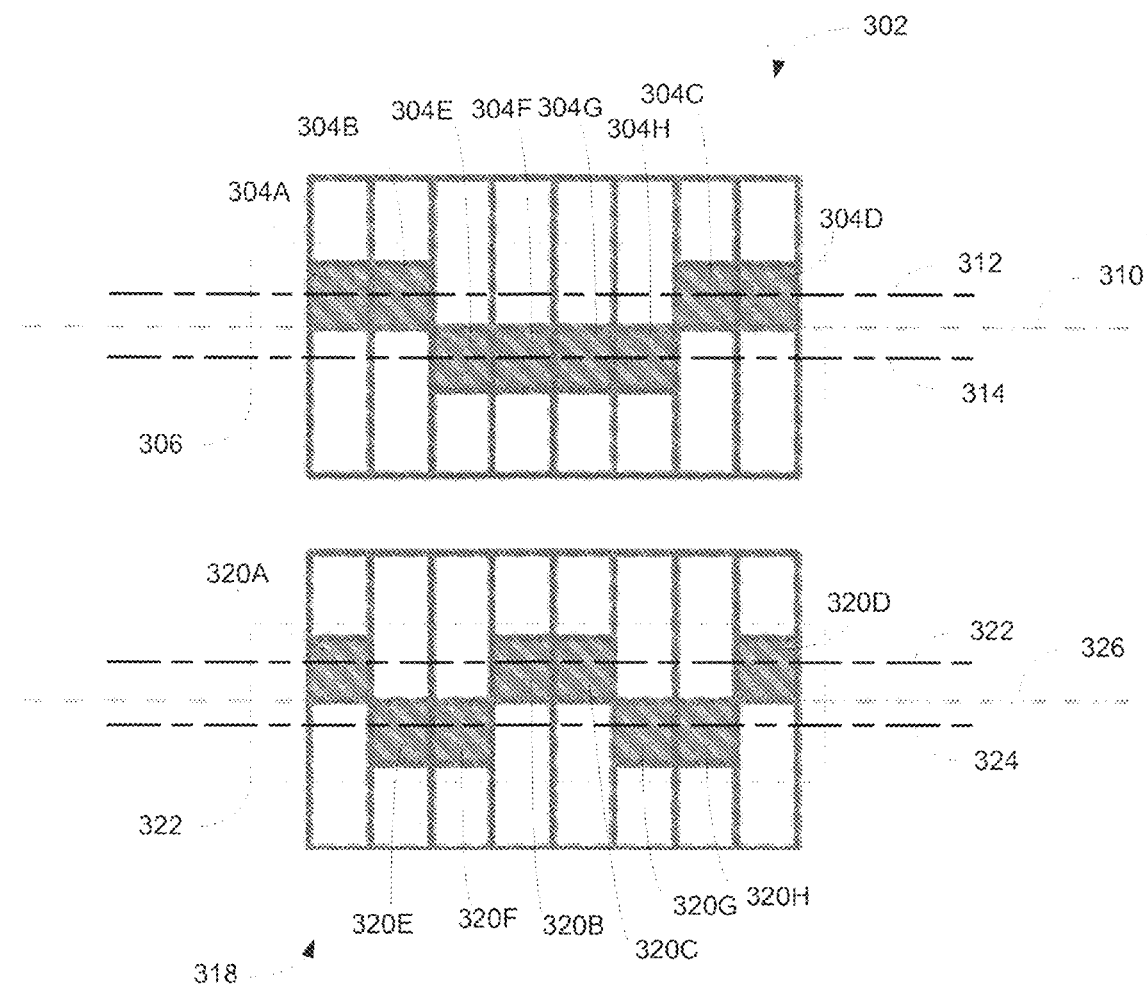
FIG. 6 is an example of a permanent magnet arrangement on a rotor hub.

In other examples, other multi-stepped configurations are possible, such as the examples illustrated in FIG. 6. In FIG. 6, a first multi-stepped example configuration 302 includes eight magnet pole arrays 304 that are included in an axial array group 306. In this example, first configuration 302, a group of left magnet pole arrays 304A and 304B and a group of right magnet pole arrays 304C and 304D form a first group of magnet pole arrays aligned along a first axis 312. In addition, a group of central magnet pole arrays 304E, 304F, 304G, 304H form a second group of magnet pole arrays aligned along a second axis 314. The first and second groups of magnet pole arrays are in different planes that are separated on the surface of the rotor by a step angle and intersect to form the axial centerline 310. Thus, although there are additional magnet pole arrays, this example configuration may also be referred to as multi-step configuration, a "double stepped" configuration, or a "¼-½-¼ step (ped)" configuration.

FIG. 6 also includes a second multi-stepped configuration 318 that includes eight magnet pole arrays 320 that are included in an axial array group 322. In this example, first configuration 302, a left magnetic pole array 320A, a pair of central magnetic pole arrays 320B and 320C, and a right magnet pole array 320D a first group of magnet pole arrays aligned along a first axis 322. In addition, a group of left intermediate magnet pole arrays 320E and 320F and a group of right intermediate pole arrays 320G and 320H form a second group of magnet pole arrays aligned along a second axis 324. The first and second groups of magnet pole arrays are in different planes that are separated on the surface of the rotor by a step angle and intersect to form a axial centerline 326. Thus, this example configuration may also be referred to as multi-step configuration, a "double stepped" configuration, or a "⅛-¼-¼-¼-⅛" step(ped)" configuration due to the positioning of the magnet pole arrays 320 in the axial array group 322.

The multi-stepped configuration is different from either a conventional, "helical" skew or a "Herringbone skew" that could be included in a squirrel-cage induction machine rotor. In this regard, the multi-stepped configuration may be considered similar to digital sampling of an analog function. A conventional helical skew (either a stator skew or a laminated skew rotor) is discretized per each lamination, but the extent spans the desired skew angle in a closely approximated analog fashion. When the main field has a small number of discrete positions possible (one per magnet rather than one per lamination: from a few to tens, to hundreds to thousands) the "step" becomes apparent. A "Herringbone skew" will span the skew angle from one end to the middle and then back again, the total angular traverse being twice the effective skew angle. A conventional skew only spans the skew angle once from top to bottom. If one was to form a conventional skew with few (N) discrete positions the total angle spanned from the extent of the skewed positions would be:

$$\text{angle\_spanned} = \text{desired\_skew\_angle} * (N-1)/N \qquad \text{Equation 1}$$

With only two discrete positions, such as in the example double-stepped configuration of FIGS. 4A and 5, the step angle to achieve the same effective skew as a Herringbone skew is one half of the skew angle of the Herringbone skew. This may result from different trigonometric identities used by taking a double integral of the flux over the rotor or stator surface for each of the tooth ripple flux harmonics considered.

The decoupling of the undesired tooth ripple flux harmonics attenuates (represented by a penalty function) the desired fundamental flux coupling the armature and the main field. In the example of a conventional skew this penalty is inversely proportional to: the sine of half of the skew angle divided by half of the skew angle; whereas the penalty function for a stepped angle configuration is inversely proportional to the cosine of one-half of the step angle. This holds true for N=2 and is independent of whether the step angle is achieved asymmetrically with only two axial groupings or symmetrically with the double-stepped configuration. The mathematical solution for the penalty factor is different for a multi-stepped configuration with N>2, but increasingly greater values of N eventually approach something similar to the conventional (helical) case. Another way to refer to and describe the double-stepped configuration is to refer to it as a "¼-½-¼ stepped configuration."

Even for the double-stepped configuration, where N=2, the choice of symmetric or asymmetric arrangements of the magnet pole arrays, is unrelated to the decoupling of the harmonic content, since the offending flux ripple is integrated over the entire stack length. The symmetric arrangement of the magnet pole arrays may correct for (cancel) the axial component of the offending harmonics (and fundamental and all other harmonics). There may be any number of magnet pole arrays occupying one of the two step-positions in the axial array group. The number of magnet pole arrays at each of the two step-positions impacts primarily the manufacturing methods and objectives.

Referring again to FIGS. 4A and 5, the magnet pole arrays 104 included in the axial array group 106 may also be symmetrically aligned with respect to an array centerline 116 of the main field 100 as best illustrated in FIG. 5. The array centerline 116 may substantially equally divide the main field hub along a plane perpendicular to the axial centerline 108. Thus, in FIGS. 4A and 5, the left central magnet pole array 104C and the right central magnet pole array 104D are symmetrically aligned with respect to the array centerline 116 of the main field 100. In addition, the left outer magnet pole array 104A and the right outer magnet pole array 104B are symmetrically aligned with respect to the array centerline 116. In examples where additional magnet pole arrays are included in the multi stepped configuration, such as the examples of FIG. 6, the magnet pole arrays 304 may be positioned on the main field to remain symmetric with respect to the respective array axis, and the array centerline of the main field. Thus, an axial array group preferably includes four, eight, sixteen, thirty-two, sixty-four, or some other multiple of four magnet pole arrays to accommodate maintaining the magnet pole arrays in a symmetric configuration about the array centerline of a particular main field. The single stepped configuration has only two magnet pole arrays, and will not be as effective as the double stepped configuration at reducing the axial force imparted on the rotor.

As also illustrated in FIG. 5, the first group of magnet pole arrays and second group of magnet pole arrays may be spaced or stepped on the surface of the main field hub by a predetermined angular distance based on a predetermined step angle 106. The angular difference between the plane of the first array axis 102 and the plane of the second array axis 104 may represent the step angle 106. In some embodiments, the step angle 106 may be the same as a magnet angle between the magnetic pole center of the magnet pole arrays, or between the mechanical pole center of the magnet pole arrays, or an edge angle between like edges of the first and second group of magnet pole arrays. In other examples, the angular orientation of the first and second groups of magnet pole arrays may be such that the step angle 206, the magnet angle, and the edge angle are different. The step angle is typically relatively small, and may be less than 10 mechanical degrees, and can be much less. Accordingly, even with the step offset of some of the magnet pole arrays 104 in an axial array group 106, a plane intersecting all of the magnet pole arrays 104 and the axial centerline 108 is present.

Figure 7:
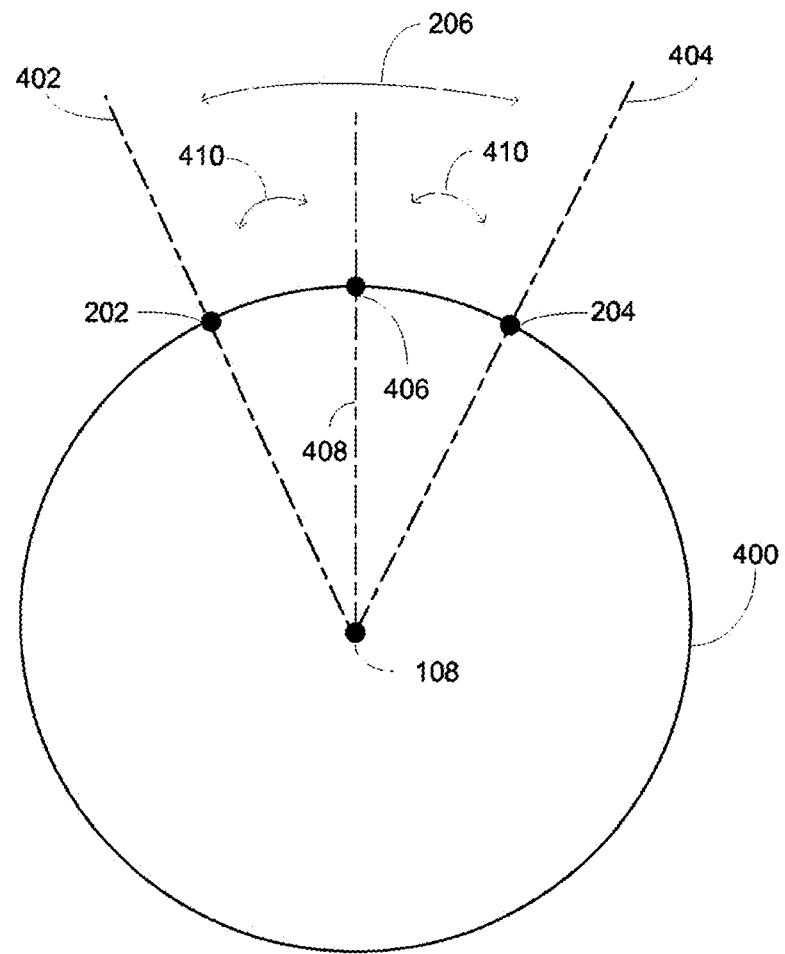
FIG. 7 is an example of an end view of a rotor hub.

FIG. 7 illustrates an end view of the example main field 400 of FIGS. 4A-F and 5, that includes the axial centerline 408. In other examples, an armature could be illustrated. In FIG. 7 a first plane 402 that intersects the first axis 202 and the axial centerline 408 and a second plane 404 that intersects the second axis 204 and the axial centerline 408 are illustrated. The step angle 206 is identified as the angular distance between the first plane 402 and the second plane 404.

During operation, the example embodiments described use stator tooth tips with a bifurcated profile to increase the apparent frequency of the tooth ripple flux and decrease the amplitude. In addition, a multi-stepped configuration permanent-magnet rotor is used to decouple the tooth-ripple harmonic flux from the rotor in such a way so as to minimize conveyance of an axial force on the rotor body, such as the rotor body in a permanent magnet generator, by reducing the unbalanced axial component of the flux linking stator and rotor. For example, the asynchronous circumferential forces of primary concern imparted by the magnets on the first axis (202) are out of phase with those imparted by the magnets on the second axis (204). Since the magnet pole arrays are symmetric with respect to the array centerline, the vectoral sum of these axial forces imparted on the rotor or stator hub is near zero. The multi-stepped rotor (or stator) allows the axial component of the (tooth-ripple flux induced) force vector to cancel between the ends of the rotor. The segmentation of the magnets (or magnet pole arrays) in the axial array groups, and the number of bifurcations may be optimized with respect to reduction of losses, air gap length, and manufacturing cost.

Figure 32:
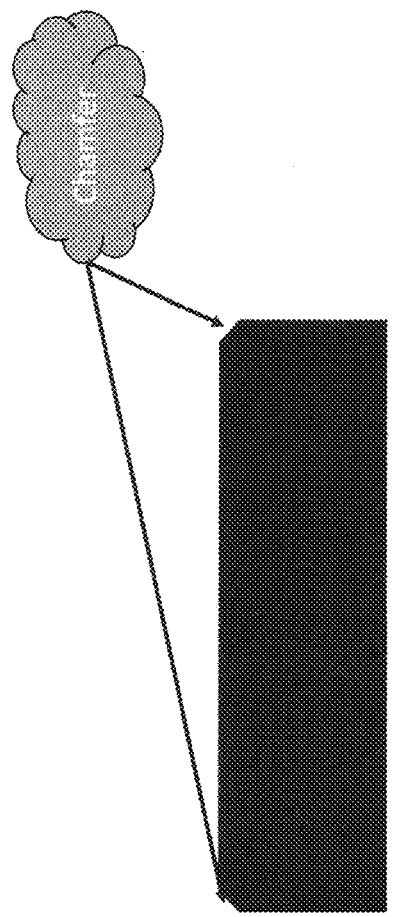
FIG. 32 is a detail view of a magnet with chamfered edges.

Additionally, the performance of a machine that includes these features may be sensitive to the shape of the leading/trailing corner of the magnet pole and the pole arc. In general, shaping of the edges of the magnet or magnets in the magnet pole arrays may not impact the step angle; however, asymmetric edge shaping can move the magnetic pole centers circumferentially around the radius of the machine. A pole arc, or pole arc angle, is the circumferential angle spanned by the physical limits of the magnet or magnet pole array with respect to the axial center line of the machine. In other words, the circumferential extending dimensions of a magnet pole array around the radius of the main winding forms the pole arc angle between planes formed at opposite edges of the magnet pole array that intersect at the axial centerline to form the pole arc angle. Chamfering or shaping the edges of one or more magnets in the magnet pole array, as shown in FIG. 32, may not change the "actual" pole arc since the opposite edges (and therefore the planes) of a magnet remain the same circumferential distance apart, but can change the "effective" magnetic pole arc. Typically, the pole arc angle should be greater than the step angle.

In the "double stepped" configuration example of FIG. 4, the first axis 202 and the second axis 204 represent the two discrete positions. Positioned midway between the first and second axes 202 and 204 on the rotor is a center step axis 406, which is the plane intersecting all the magnet pole arrays such that all the magnet pole arrays are along the center step axis 406. The first axis 202 and the second axis 204 are an equal distance in opposite directions from the center step axis 406. Thus, the magnet pole arrays included in the axial group array may be symmetrical with respect to the center step axis 406 as a whole, since the magnet pole arrays may be positioned to be balanced across the center step axis 406. In addition, the center step axis 406 forms a third plane 408, or center step plane, that intersects the center step axis 406 and the axial centerline 108. The third plane 408 is equally separated from each of the first and second axes 202 and 204 by a center step angle 410. Thus, each of the axial group arrays may be symmetrical with respect to a respective center step axis 406 of a respective axial group array.

Figure 8:
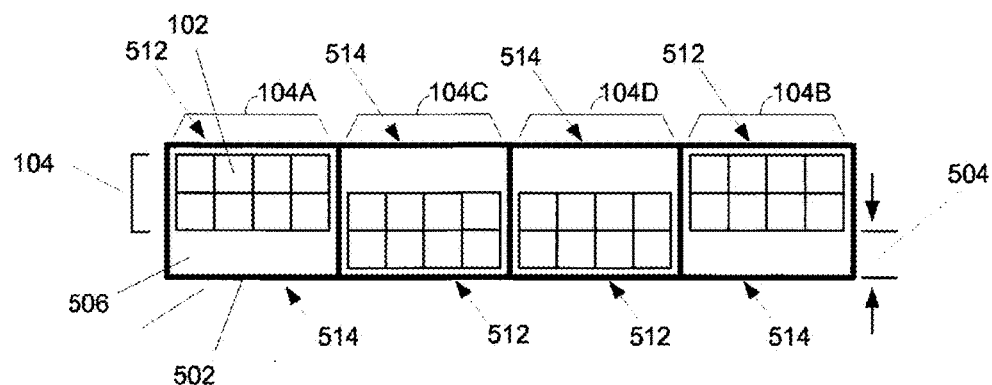
FIG. 8 is an example configuration of an axial array group.

FIG. 8 is another example illustration of the magnet pole arrays 104 in an axial array group 106 included on the rotor of FIGS. 4A-4F. Each of the arrays of magnets 102 included on the rotor may be mounted to a respective plate 502, which may also be referred to as a carrier plate or mounting plate. In the example of FIG. 8, multiple magnets are included in each of the magnet pole arrays 104, and each magnet pole array 104 is mounted on a separate carrier plate 502. The carrier plate 502 may be a planar substantially flat surface that is uniformly sized for mounting in any one of a plurality of locations on the rotor 100. In other examples, the carrier plates 502 may be mounted on a stator. In addition, the carrier plates 502 may be a standardized weight and thickness. The magnets 102 may be mounted on the respective carrier plates 502 to form a step offset 504 on the surface. The step offset 504 may be chosen to achieve the step angle 106 of FIG. 4 such that the centerline of the magnet pole arrays 104 is offset from the centerline of the carrier plate 502 by approximately one half of the step offset 504 (neglecting clearance and other secondary manufacturing concerns).

Each of the carrier plates 502 includes a top surface 506 to accommodate one or more permanent magnets 102, and a bottom surface 508 formed to abut and be contiguous with the rotor or stator hub. The rotor or stator may be formed with uniform mounting locations for the carrier plates 502 such that a number of the carrier plates 502 can be concentrically mounted on the rotor or stator to substantially surround and enclose the outer surface of the rotor or the stator. The rotor or stator may be a faceted rotor/stator or a non-faceted rotor/stator that is formed to receive and fixedly hold in position each of the plates 502. A faceted rotor or stator may be achieved by, for example, faceting a round rotor or stator such that each facet will accept a plurality of magnet pole arrays 104 forming one or more axial array groups. Each facet may accommodate one or more axial array groups.

Since the mounting plates 502 are substantially identical, the rotor or stator may remain balanced after the mounting plates 502 are installed thereon. Thus, a single plate 502 having a standardized width, length and height may be manufactured and mounted on any one of a plurality of different plate mounting positions on the rotor or stator to form the permanent magnet rotor or stator for the electric machine. Since the mounting plates 502 are substantially identical, they may also have a common central axis, and may be mounted to align the common central axes of different mounting plates 502.

One or more permanent magnets 102 may be mounted on a carrier plate 502 prior to mounting the carrier plate 502 on the rotor or stator. For example, the magnets 102 may be mounted to form one or more columns of magnet assemblies on the flat carrier plates 502. The magnets 102 may be magnetized before or after being mounted to the plates 502. In the case of magnets 102 magnetized prior to installation on the plates 502, since the magnets 102 are installed on the plates 502 prior to being installed on the rotor or stator, appropriate mechanical force may be used to move the magnets 102 into position on the plates 502 to overcome attraction and repelling forces due to the magnetic fields of neighboring magnets 102 until the magnets 102 are fastened to the respective flat plate 502. Mechanical forces may be applied by jigs, presses, guide tools or any other structure or mechanism capable of overcoming magnetic forces to move the magnets 102 into position with respect to each other on a plate 502.

As illustrated in FIG. 8, each plate 502 may include an array of magnets, and may be of uniform size and dimensions. Following magnetization of the magnets 102 on a respective plate 502, the plate 502 may be oriented in any desired orientation to obtain the desired configuration of the magnets mounted on the plate and the associated step offsets 504 on the surface of the plates 502.

Referring again to FIG. 4, the plates 502 upon which each of the magnet pole arrays 104 are mounted are illustrated as dotted lines. As illustrated in FIG. 8, the plates 502 may be aligned horizontally and vertically with respect to each other along the respective common central axes of the plates 502. The magnet pole arrays 104 mounted on the plates 502 may be positioned to include the step offset 504. The step offset 504 may correspond to the predetermined step angle 206. Thus, in the example of FIG. 4, and as illustrated in FIG. 8, the plates 502 containing the left and right outer magnet pole arrays 104A and 104B are positioned in a first orientation such that a portion of the respective plates 502 upon which a magnet 102 is not mounted (the step offset) is nearest the axial centerline 108, whereas the respective plates 502 containing the left and right central magnet pole arrays 104C and 104D have a portion upon which a magnet 102 is not mounted (the step offset) is farthest away from the center step axis 406 (FIG. 4). Accordingly, the permanent magnets 102 may be uniformly mounted on each of the carrier plates 502 proximate a first edge 512 of the carrier plates 502 and spaced away from a second edge 514 of the carrier plates 502.

Figure 9:
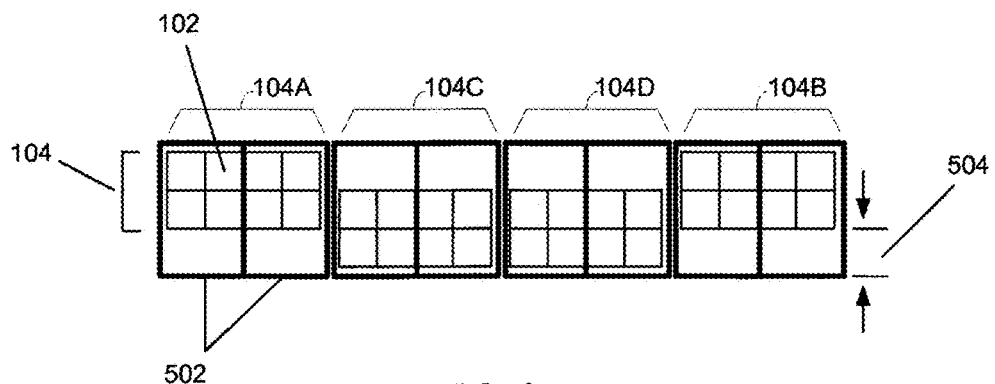
FIG. 9 is another example configuration of an axial array group.

In alternative examples, the magnets 102 may be mounted on the carrier plate 502 in other configurations. For example, there may be multiple uniformly sized carrier plates 502 within each magnet pole array 104, as illustrated in FIG. 9. In FIG. 9, the plates 502 are uniformly sized and aligned along the common central axis.

Figure 10:
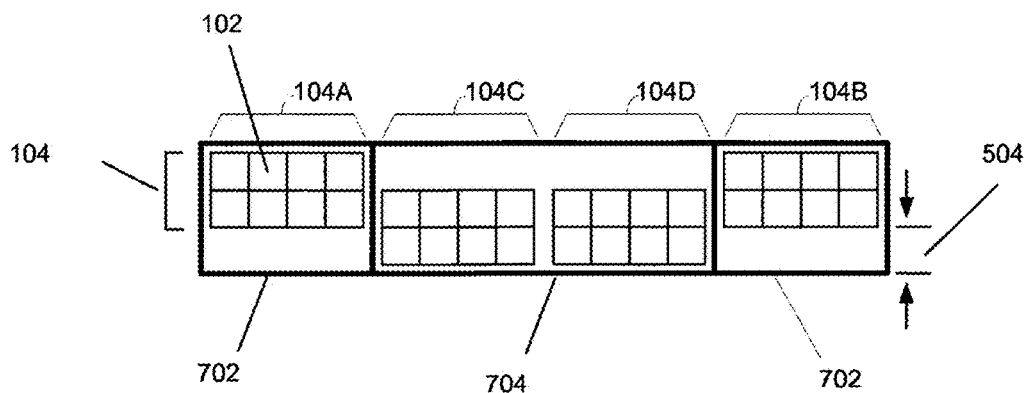
FIG. 10 is yet another example configuration of an axial array group.

In another example, the outer magnet pole arrays 104A and 104B may each be mounted on a first uniformly sized carrier plate 702 and the central magnet pole arrays 104C and 104D may be mounted on a second uniformly sized carrier plate 704. In this example configuration, the central magnet pole arrays 104C and 104D share the single common carrier plate 704, as illustrated in FIG. 10. In FIG. 10, the plates 502 are uniformly sized and aligned along the common central axis.

Figure 11:
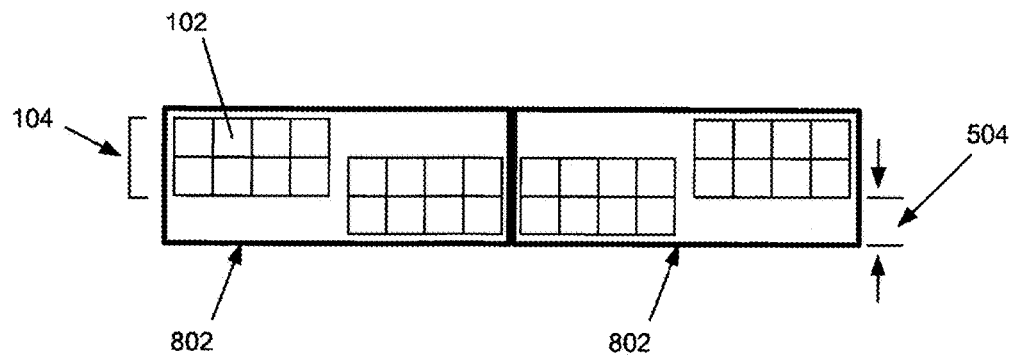
FIG. 11 is still another example configuration of an axial array group.

In still another example, multiple magnet pole arrays share a common carrier plate 802. More specifically, an outer magnet pole array 104A or 104B and a central magnetic pole array 104C or 104D share a common carrier plate 802, as illustrated in FIG. 11. In FIG. 11, the plates 502 remain uniformly sized and aligned along the common central axis.

Figure 12:
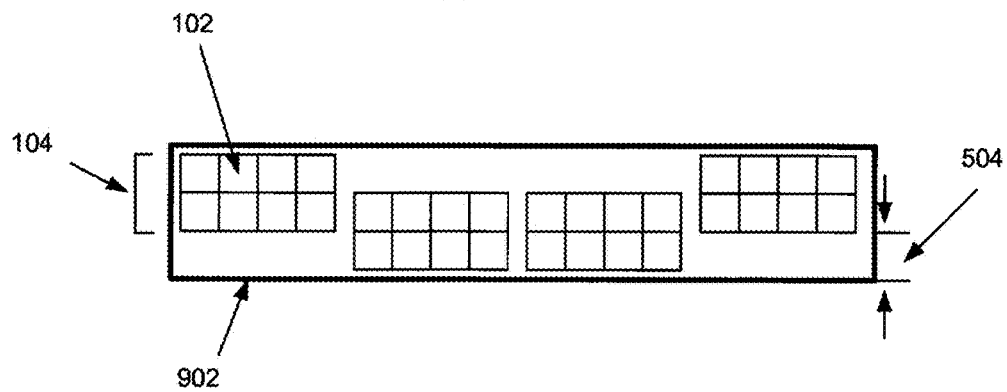
FIG. 12 is also an example configuration of an axial array group.

In yet another example, all the magnet pole arrays in an axial array group may share a common carrier plate 902, as illustrated in FIG. 12. In FIG. 12, the plates 502 forming different axial array groups are uniformly sized and each of the plates includes the common central axis.

Figure 13:
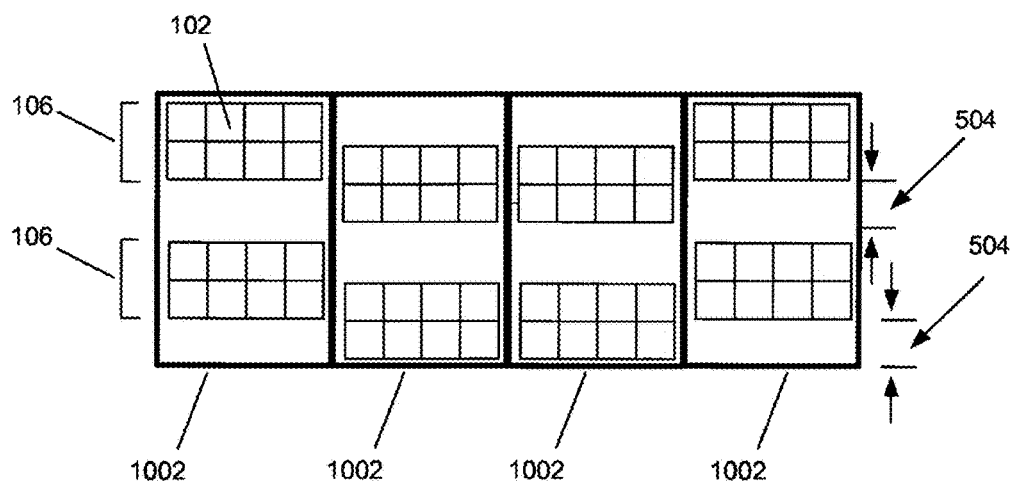
FIG. 13 is an example configuration of multiple axial array groups.

In another example, the magnet pole arrays 104 from different axial array groups 106 may share a common carrier plate 1002, as illustrated in FIG. 13. In this example configuration, the rotor or stator may include a fewer number of facets on the surface of the rotor or stator hub than rotor or stator poles (half the facets of FIGS. 8-12 since FIGS. 8-12 could have an equal number of rotor poles and facets.) In FIG. 13, the plates 502 are uniformly sized and aligned along the common central axis.

In still other examples the magnets and carrier plates may be arranged in any other configuration and be aligned along the common central axis.

Figure 14:
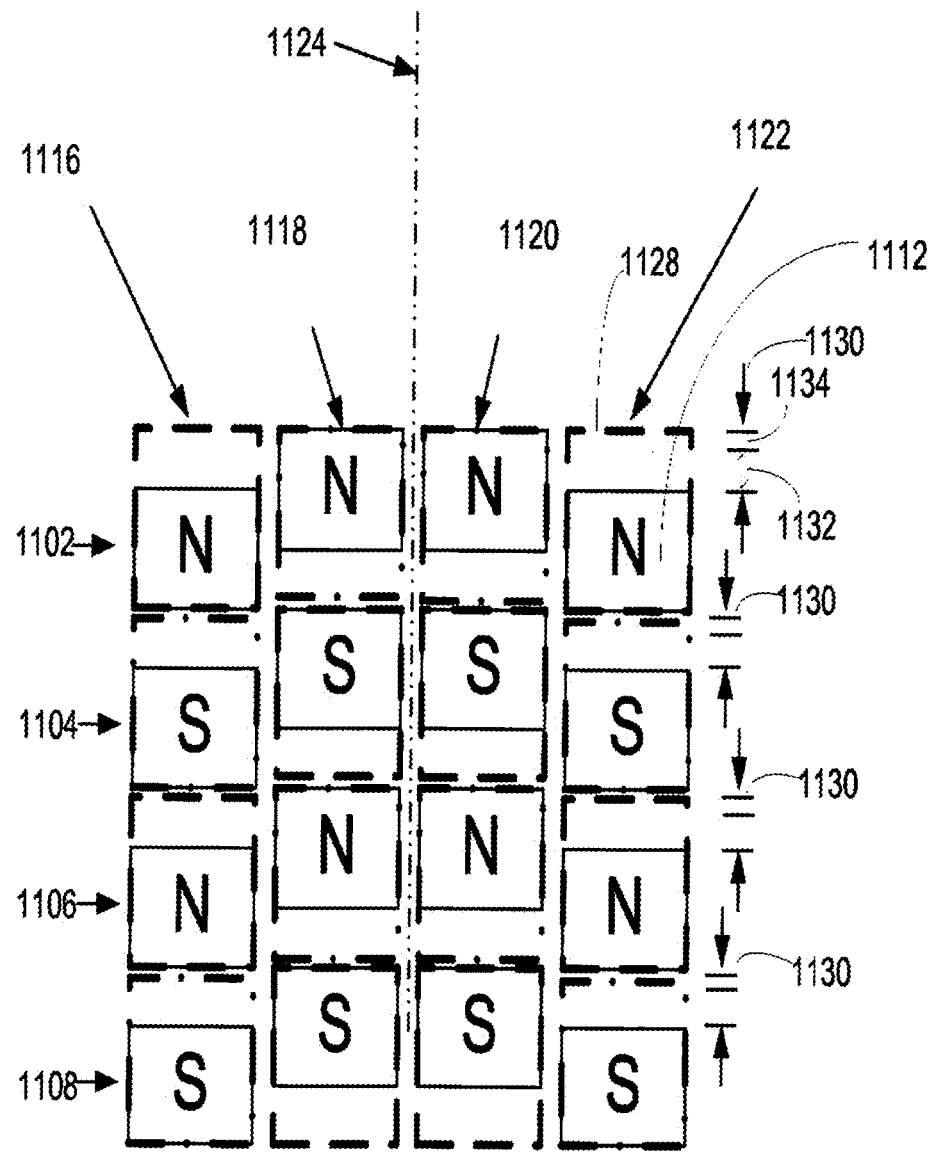
FIG. 14 is an example configuration of permanent magnets on a rotor hub.

FIG. 14 is an example illustration of the configuration of the north (N) poles and south (S) poles in each of four different axial array groups 1102, 1104, 1106 and 1108. The first and second axial array groups 1102 and 1104 cooperatively form a first north/south pair or group of axial array groups, and the third and fourth axial array groups 1106 and 1108 form a second north/south pair or group of axial array groups. Each of the magnet pole arrays 1112 in one of the axial array groups may be magnetized to have the same north (N) pole or south (S) pole. Between a pair of axial array groups, each of the magnet pole arrays 1112 may have similarly oriented north and south poles. Thus, for example, all of the magnet pole arrays 1112 in the first axial array group 1102 may be configured with a north (N) pole, and all the magnet pole arrays 1112 in the second axial array group 1104 may be configured as south (S) poles.

This example includes axial pole arrays 1112 in a similar configuration to the outer and central pole arrays as illustrated in the example double stepped configuration of FIGS. 4A-5. Thus, the fourth axial array group 1108, for example, includes a left outer magnet pole array 1116, a left central magnet pole array 1118, a right central magnet pole array 1120, and a right outer magnet pole array 1122. In addition, similar to the example of FIG. 5, the left central magnet pole array 1118 is position on the rotor or stator hub symmetrically with respect to the right central magnet pole array 1120 about an array centerline 1124, and the left outer magnet pole array 1116 is symmetrical with the right outer magnet pole array 1122 about the array centerline 1124. In other multi-stepped configurations, additional or fewer poles can be present.

In FIG. 14, each of the magnet pole arrays 1112 is illustrated on the surface of a uniform carrier plate 1128 having an interpole gap 1130 included in the surface. The carrier plate 1128 is uniform due to having the same dimensions for all the carrier plates 1128 on the machine, and therefore having common central axes. The interpole gap 1130 is the area between adjacently positioned magnet pole arrays 1112 that are included in different axial array groups. Each interpole gap 1130 of a respective carrier plate 1128 includes the step offset 1132, and an interpole space 1134 that provides manufacturing and assembly tolerances. In alternative examples, other configurations of carrier plates are possible, as previously discussed. In addition, in some examples, the interpole space may be omitted where additional manufacturing and assembly tolerances are unnecessary or undesired. In these example configurations, the magnets may be mounted on the carrier plate 1128 to be spaced away from a first edge of the carrier plate by the step offset 1132, and spaced away from an opposing edge of the carrier plate by a relatively small distance.

It should be understood that the interpole gap can describe the entirety of the distance between magnets in adjacently located axial array groups, which may include: 1) the interpole gap 1130 of a respective carrier plate; 2) any spacing between the carrier plate and a carrier plate adjacently located on the hub; and 3) the interpole space opposite the interpole gap 1130 on the adjacently positioned carrier plate. Accordingly, as used herein, the term "interpole gap" refers to that portion of the entire interpole gap occupied by the carrier plate, and more specifically to the portion of the entire interpole gap occupied by the step offset (and, in some examples, also the interpole space) on a respective carrier plate.

Figure 15:
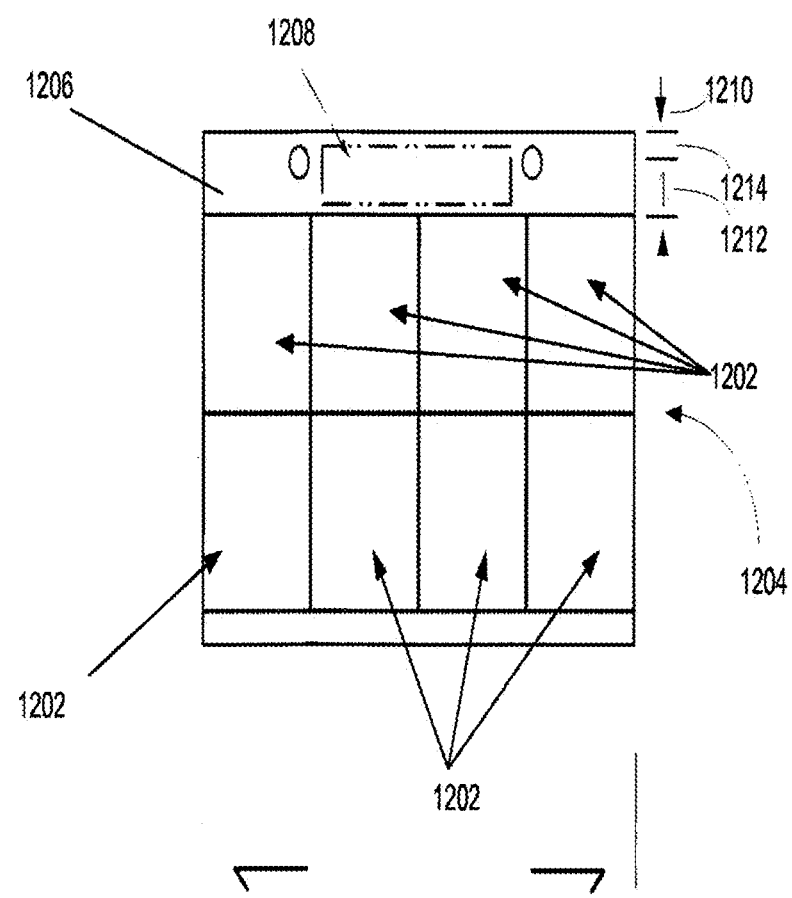
FIG. 15 is an example carrier plate that includes permanent magnets.
Figure 16:
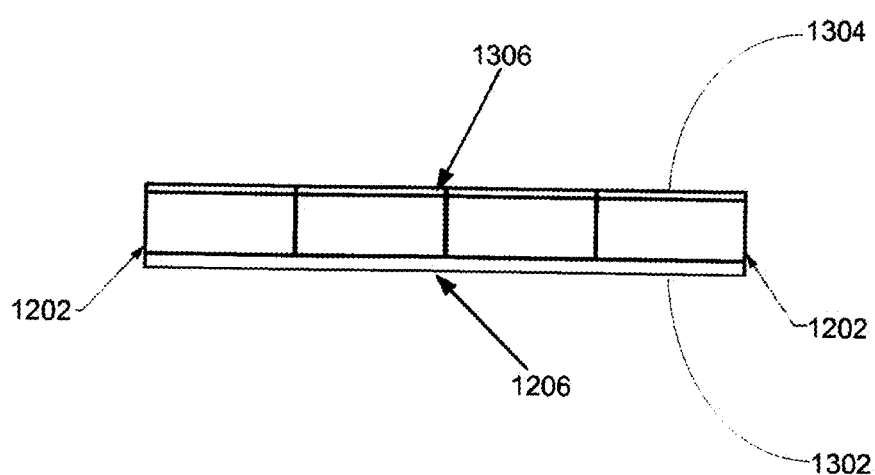
FIG. 16 is an example carrier plate that includes permanent magnets.

FIGS. 15 and 16 illustrate a detailed example of an array of magnets 1202 included in a magnet pole array 1204 that are mounted on a single carrier plate 1206. Depending on the magnetization of the magnets, the configuration of FIG. 16 may represent a north pole or a south pole within an axial magnet group. Accordingly, efficiency of manufacturing and assembly is advantageously improved due to fewer parts, interchangeability of parts and flexibility in orientation of the metal plates on the rotor. In addition, an array of magnets may be handled as a single piece despite actually being a plurality of magnets due to being fixedly mounted on the carrier plate 1206. Alternatively, in another example, a single magnet may be mounted on the carrier plate 1206, and still provide uniformity in manufacturing due to reduced part count and flexibility in orientation and mounting of the plate on the rotor. Thus, part count may be minimized, and the electric machine manufacturing process may be standardized.

Use of a carrier plate 1206 to contain the magnet pole array 1204 results in a reduced part count during the manufacturing process, and standardized manufacturing processes. For example, components used to make a magnet pole array 1204 of North or South polarity can be substantially identical, but magnetized in opposite polarities. The carrier plates 1206 may also include a nameplate 1208. The nameplate 1208 may include identifying information of the magnets 1202, the machine upon which the carrier plate 1206 can be installed, the polarity direction of the magnets installed on the carrier plate 1206, and any other information.

The magnets 1202 may be mounted on a flat surface of the carrier plate 1206 to create an interpole gap 1210 on a part of the surface. The interpole gap 1210 may include a step offset 1212 and an interpole space 1214. All of the magnets 1202 may be mounted on carrier plates 1206 having the same dimensions and a common central axis. In addition, the magnets may be mounted in the same configuration and location on each of the carrier plates 1206. As previously discussed, the step offset 1212 may provide a fixed predetermined offset between adjacently located magnet pole arrays 1204 in an axial group array. As a result, the step offset 1212 may provide the previously discussed step angle between magnet pole arrays 1204 included in an axial array group. Thus, in an axial array group such as the examples illustrated in FIGS. 5 and 11, the different positioning of the magnet pole arrays 1204 in the axial array group, such as between the left outer magnet pole array and the left central magnet pole array, may be achieved using the same carrier plate 1204 and magnet configuration by rotating the carrier plate 180 degrees prior to installation on the rotor, and magnetizing the magnets on the carrier plate with opposite poles. In other words, in the example of an axial array group, the step offset 1212 between the central magnet pole arrays and the outer magnet pole arrays may be achieved by rotating two of four of the respective plates 180 degrees from a first orientation to a second orientation before installation of the carrier plates to form the axial group array. In addition, uniformly sized and shaped magnets 1202 may be mounted on all of the plates 1206 as illustrated in the example of FIG. 16 in which eight uniformly sized magnets are illustrated. Further, since the plates 1206 are uniformly dimensioned, the plates 1206 may be symmetrically aligned along the center step axis of the arrays and the common central axis of the carrier plates 1206.

FIG. 15 is a perspective side view of an example of the carrier plate 1206 having a plurality of magnets 1202 mounted thereon. The magnets 1202 may be rigidly maintained in position on the carrier plate 1206. A first side 1302 of each of the magnets 1202 may be contiguously mounted on the carrier plate 1206. A second side 1304 of each of the magnets 1202 may be contiguous with a hold down 1306, such as a wrap, a banding, or any other material configured to surround and be concentric with the rotor while maintaining contiguous contact with the second side 1304 of the magnets 1202 to maintain the magnets 1202 on the carrier plate 1204 as the rotor spins.

Stepped rotors may be applied in permanent magnet (PM) machines. In certain applications the magnets may be segmented. Such segmentation of the magnets is more prevalent in large machines with a full power converter (due to the high frequency flux imposed on magnet pole face). The multi-stepped configuration may use segmentation in the form of an array of magnets mounted on the carrier plate. The array of magnets may be bonded to a faceted rotor or stator hub to create the multi-stepped configuration as illustrated in the example of FIG. 17, which is Section B-B of FIG. 4.

Figure 17:
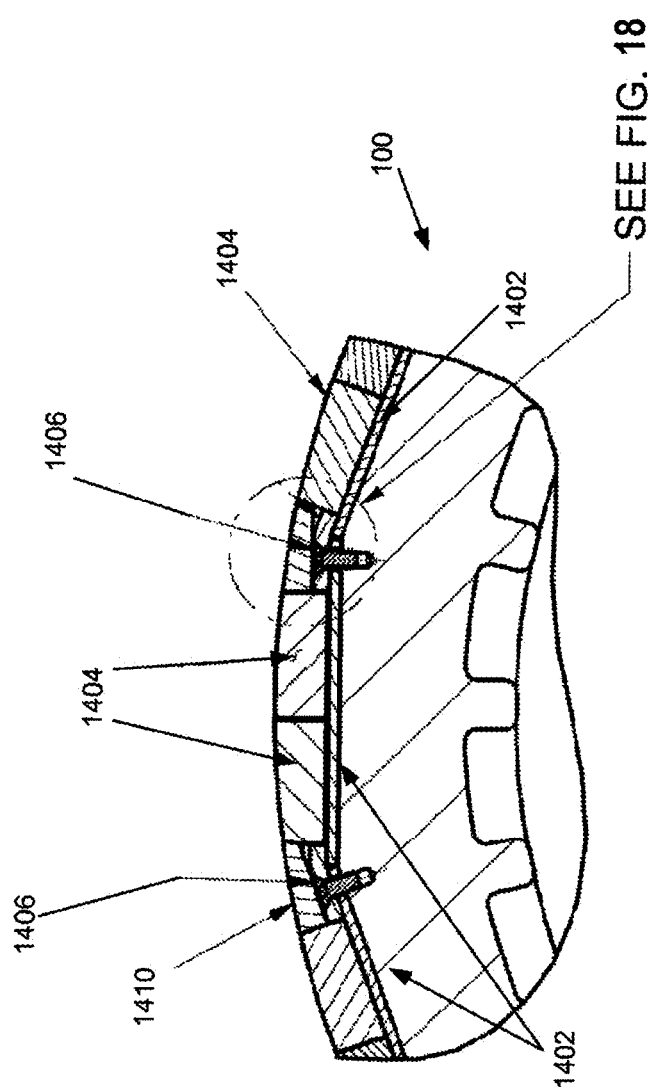
FIG. 17 is a cross-sectional view of a portion of an example rotor hub having carrier plates.

In FIG. 17, a plurality of carrier plates 1402 having magnets 1404 are illustrated as mounted on a plurality of facets 1406 of the example rotor 100 or stator. The arrangement between the carrier plates 1402 and the magnets 1404 may be any form of magnet pole assembly that can be used for each step angle, as previously discussed. The carrier plates 1402 may be coupled to the respective facets 1406 by any carrier plate coupling mechanisms 1408, such as fasteners. In one example, the coupling mechanisms 1408 may be coupled with the rotor 100 to be positioned on a line parallel with the axis of rotation of the rotor 100 or stator.

In FIG. 17, each of the carrier plates 1402 are illustrated as fixedly mounted on a facet 1404 of the rotor 100 or stator using fasteners, such as threaded screws. In this example, threaded holes in the rotor 100 and corresponding through holes in the carrier plates 1402 may be at predetermined locations allowing alignment and installation of the carrier plates 1402 without additional measurement. Coupling mechanisms 1406 on the carrier plates 1402, such as through holes, may be formed between the magnet pole assemblies to avoid compression of the magnets 1404 by the coupling mechanisms 1406, or any other form of compressive force or shear force contact between the magnets 1404 and the coupling mechanisms 1406.

Advantageously, indexing from step angle position to step angle position can be avoided due to the positioning of the carrier plate 1402 coupling mechanisms 1406 on the rotor or stator. In addition, the carrier plates 1402 may be aligned such that the coupling mechanisms 1406 are shared among multiple carrier plates 1402. For example, through holes in different carrier plates 1402 may be aligned on the rotor or stator so that a single fastener may be inserted through multiple aligned through holes on different carrier plates 1402 prior to being fixedly connected with the rotor or stator. Accordingly, a single coupling mechanism 1406 may fixedly couple multiple carrier plates 1402 to the rotor or stator thereby improving the manufacturing process and minimizing parts. Wedges 1410 may be positioned to cover the coupling mechanisms 1406 and cooperatively operate with the magnets 1404 to provide a substantially uniform unbroken outer surface around the hub.

Figure 18:
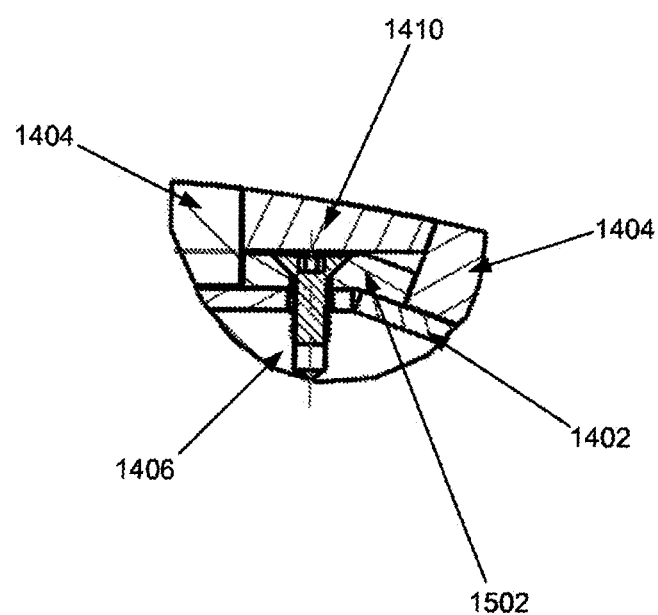
FIG. 18 is a detailed view of a portion of the example rotor hub of FIG. 17.

As illustrated in the example of FIG. 18, which is a magnified portion of FIG. 17, the wedges 1410 may be inserted between the magnets 1404 on a carrier plate 1402. The wedges 1410 may a non-magnetic filler that fill the gaps or cover the gaps between the magnets 1404 to make the surface of the rotor or stator uniform or substantially smooth and circular for banding or wrapping the rotor or stator. The wedges 1410 may be formed or positioned above the fastener 1406 between the magnets 1404. In general, banding or wrapping is used to brace and maintain the position of the magnets 1404 and the carrier plates 1402. The wedges 1410 may be formed of ceramic, fiberglass, plastic, putty, or any other non-magnetic (non-ferrous) material. In one example, a non-magnetic stainless steel may be used although it is both conducting and slightly magnetic.

In FIG. 18, a carrier plate clamping strip 1502 may be position adjacent to the fastener 1406 between the carrier plates 1402 and the magnets 1404. The carrier plate clamping strip 1502 may be formed from a rigid material such as steel and serves to clamp adjacent carrier plates 1502 to the rotor or stator hub. The carrier plate clamping strip 1502 spans carrier plates 1402 on adjacent facets of the rotor or stator hub. Since the carrier plate clamping strips 1502 span carrier plates 1402 on adjacent facets, fasteners 1406 may not be necessary on each edge of a carrier plate 1402. Thus, the carrier plate clamping strip 1502 allows the use of fewer fasteners 1406, such as half the number of fasteners 1406, while still providing similar mechanical coupling between the rotor or stator and each of the carrier plates 1402. Use of the carrier plate clamping strips 1502 may be beneficial when surface area and space on the rotor or stator is constrained. In addition, use of the carrier plate clamping strips 1502 provides benefits during manufacturing by assembly steps, part count, fastener torque checks, and other aspects of the manufacturing process.

Figure 19:
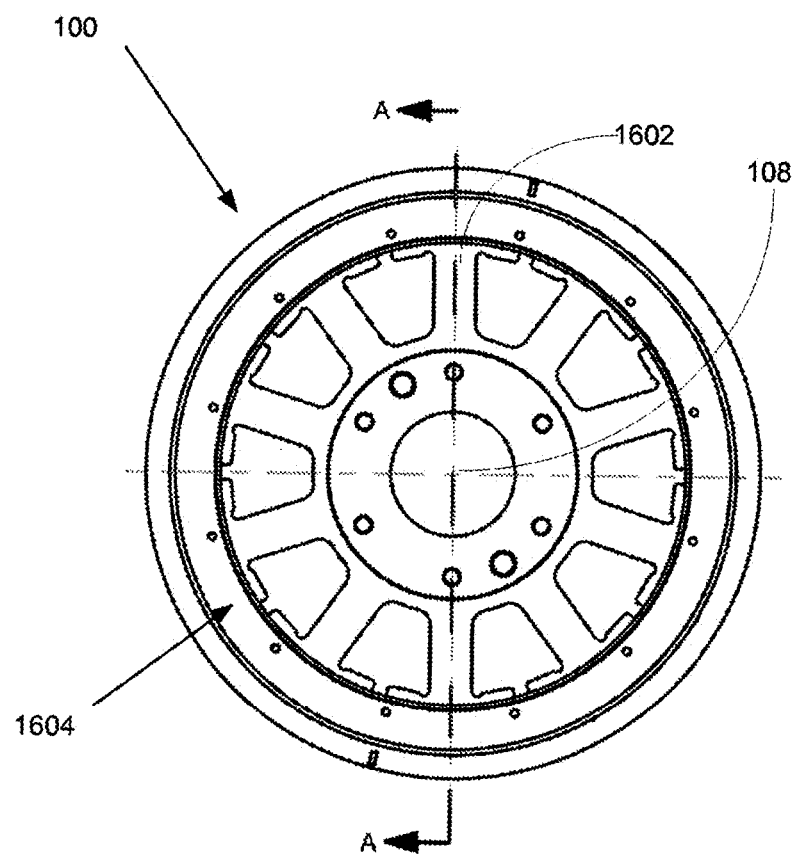
FIG. 19 is an example end view of the rotor hub of FIG. 4.

FIG. 19 is an example end view of the rotor hub 100 illustrated in FIG. 4 that illustrates the stator 1602 rotatable positioned within the rotor hub 100 and an end ring 1604. In other examples, the rotor could be rotatably positioned within the stator. In FIG. 19, the end rings 1604 may be positioned at both ends of the rotor 100 concentric with the axial centerline 108 of the machine. The end rings 1604 may be positioned on an outer edge contiguous with a last row of the magnets to assist in holding the magnets in position on the rotor 100. In addition, the end rings 1604 may act as a protective end covers to prevent damage, such as chipping, of the magnets near the outer edges of the rotor 1604.

Figure 20:
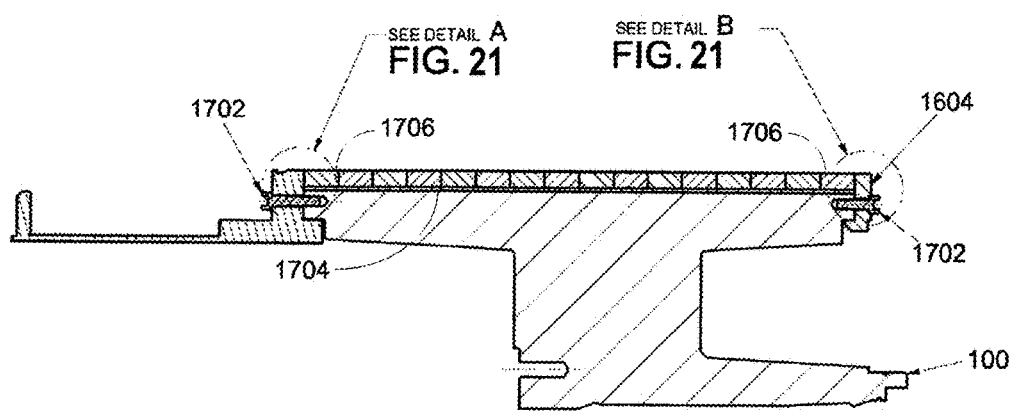
FIG. 20 is a cross-sectional view of a portion of the rotor hub in FIG. 19.
Figure 21:
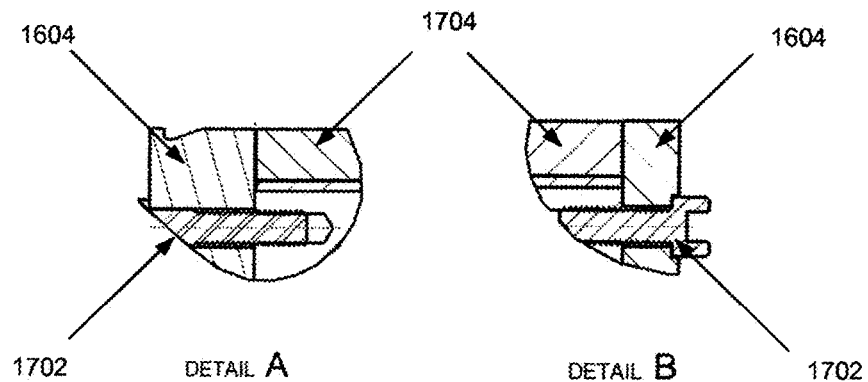
FIG. 21 depicts detailed views of portions of the rotor hub of FIG. 20.

FIG. 20 is a partial section view along section lines A-A in FIG. 19 illustrating an example of a portion of the end ring 1604, which is coupled to the rotor 100 by a mechanical fastening mechanism 1702, such as threaded fasteners. In one example, the rotor hub may be formed to include threaded apertures that receive the threaded fasteners 1702. The end rings 1604 may be positioned on the rotor 100 at an outer edge of the carrier plates 1704 positioned along the ends of the rotor 100. FIG. 21 illustrates details A and B from FIG. 20, which depict an example of the end rings 1604 fastened to the rotor hub adjacent the carrier plates 1704. The end rings 1604 do not compress the magnets 1706, but instead are used to maintain the carrier plates 1704 and magnets 1706 in a fixed position on the rotor 100 in resistance to centrifugal forces created when the rotor 100 (or stator) rotates. In the example of FIG. 21, there is a predetermined gap of 0.3 centimeters between the end ring 1604 and the carrier plates 1704. In other examples, other predetermined gaps may be used. In addition, the end rings 1604 provide a mechanical protective barrier of the outer edges of the magnets 1706 and carrier plates 1704, as previously discussed.

Figure 22:
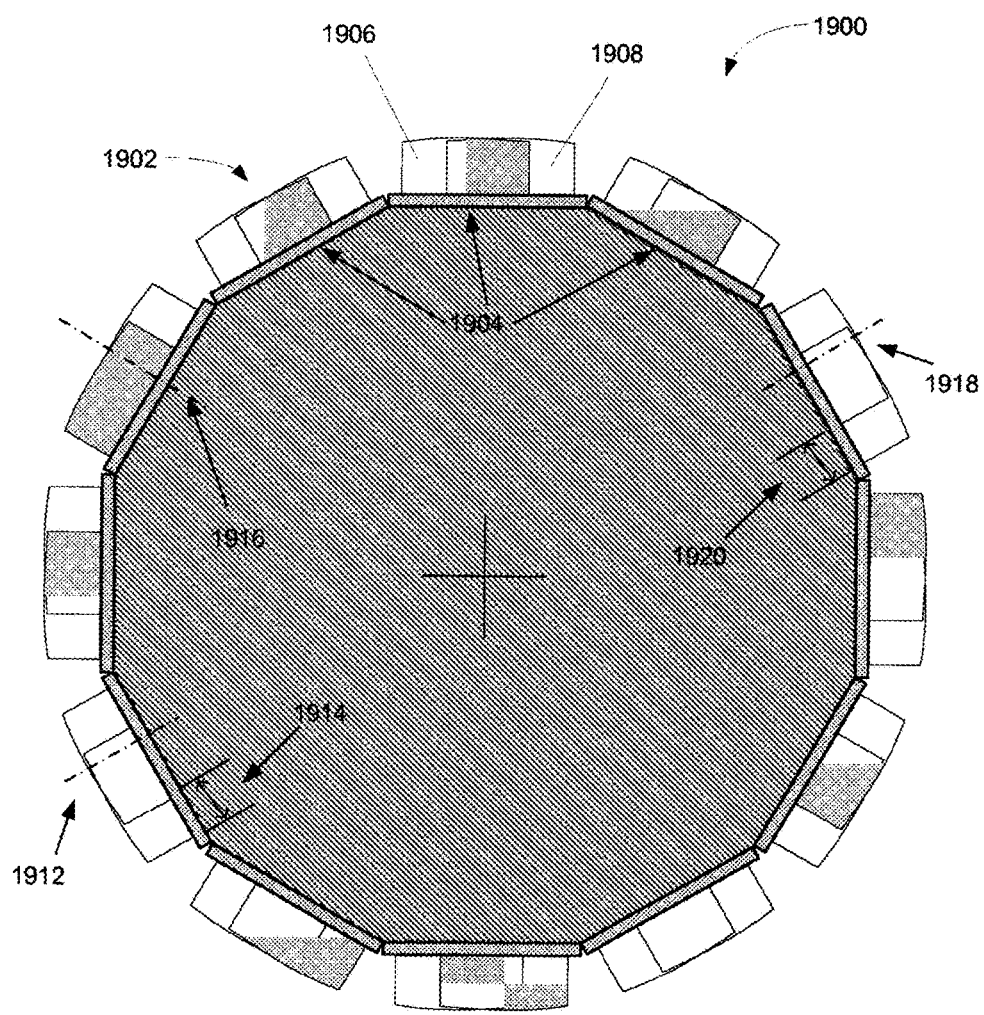
FIG. 22 is a cross-sectional view of an example rotor hub that includes carrier plates.

FIG. 22 is an example cutaway sectional view of a faceted rotor 1900 similar to the rotor of FIG. 4. In other examples, the rotor could instead be the stator of the machine. In the example configuration, the rotor 1900 includes a number of flat planar surfaces longitudinally extending parallel to the axial centerline of the machine. Each of the facets of the rotor 1900 may be formed to accommodate uniformly sized carrier plates 1904 having uniformly sized and shaped magnets, such as rectangular magnets. In FIG. 22, the magnet assemblies 1902 are positioned on the carrier plates 1904, and can be formed as asymmetric rectangular blocks.

For illustrative purposes, in FIG. 22 a 1st magnet pole array 1906 is illustrated in phantom so that the 2nd magnet pole array 1908 sequentially aligned along the same facet is visible. Any number of magnet pole arrays may be aligned on a facet of the rotor. The carrier plates 1904 may be mounted on each of the respective facets of the rotor with the common central axes aligned in an axial array group to form a multi-stepped, or a double stepped configuration. In this configuration, the magnet pole arrays in each of the axial array groups are symmetrically positioned on the respective facet with respect to the other magnet pole arrays in the axial array group occupying that same facet. The present embodiments and discussion describe examples where the carrier plates 1904 are arranged on the facets of the hub uniformly to coincide with an axial centerline of machine. Thus, alignment with a common central axis of the carrier plates 1904 as discussed herein should be construed as also being aligned with the axial centerline of the machine based on a bisector line originating from the axial centerline of the machine that perpendicularly intersects each of the carrier plates. In other embodiments where the common central axes of the carrier plates 1908 are not perpendicularly aligned with a bisector line originating from the axial centerline of the machine, the various parts described herein should be construed as aligned with the axial centerline of the machine.

In the example of rectangular magnets positioned in arrays, due to the rectangular profile of the magnets mounted on the carrier plates, such as the squared corners of the magnets, the outer rotor surface may not be uniformly cylindrical, depending on the size of the machine. Accordingly, the rectangular blocks formed on the carrier plates 1904 by the magnets can present a more uneven surface for magnet retention banding or wrapping used to adhere and maintain the carrier plates and magnets on the rotor. In other examples, square magnets, cylindrical magnets or any other shaped magnet having a profile that does not create a substantially uniform cylindrical surface when mounted on the rotor may be used.

In a double stepped configuration, such as in the example of FIGS. 4A and 8, the first and fourth carrier plates of the first and fourth magnet pole arrays (outer magnet pole arrays) in the axial array group may each occupy a quarter of the available surface area of a respective facet. (see 104A and 104B in FIGS. 4A and 8) In this example configuration, a central axis 1912 of the first and fourth magnet pole arrays may be aligned on their respective carrier plates 1904 to have a step offset 1914 in a first direction from a common central axis 1916, or perpendicular bisector of the axial centerline of the machine, of the respective carrier plate 1904 upon which the respective magnet pole arrays are mounted.

In this example configuration, the second and third carrier plates (see 104C and 104D in FIGS. 4A and 8) may occupy a remaining half of the available surface area of the respective facet and a central axis 1918 of each of the second and third magnet pole arrays (central arrays) may be aligned on the respective second and third carrier plates to be offset from the common central axis 1916 of the respective carrier plates 1904 in a second step offset 1920. The second step offset 1920 may shift the alignment of the respective magnet arrays in a second direction that is opposite the first direction. The first step offset 1914 and the second step offset 1920 may be the same distance of offset from the centerline 1916 of the carrier plates 1904. Thus, with a faceted machine the example of ¼, ½, ¼, stepped configuration refers to the double stepped configuration as the carrier plates 1904 occupy the surface area of a respective facet of the machine.

As illustrated in the example configuration of FIG. 22, the first magnet pole array 1906 extends to be near a first edge of a first carrier plate 1904 and be offset by the first step offset distance 1914 from a second edge of the respective first carrier plate 1904. The second magnet pole array 1908, on the other hand, extends to be near the second edge of a second carrier plate 1904 and be offset by the second step offset distance 1920 from a second edge of the second carrier plate 1904, where the first and second carrier plates are sequentially aligned along their common central axes in a facet of the machine to form a axial array group. Due to the centerline axis 1912 of the magnet pole arrays 1904 not being on the common centerline axis 1916 of the carrier plate 1904, if the magnets are formed without any curved surfaces, depending on the diameter of the hub, a non-uniformly modulated cylindrical outer surface of the rotor or stator hub may result. This non-smooth outer surface may make banding or wrapping the rotor non-uniform, which may be undesirable. The modulations resulting from the square corners of the magnets may create variations in the otherwise smooth outer surface of the rotor or stator hub, depending on the diameter of the hub. As the diameter of the hub increases, the modulations caused by the magnets can become less pronounced until the variations no longer affect the outer cylindrical surface, and the outer cylindrical surface becomes substantially smooth.

In hubs with a diameter where the square corners of the magnets can undesirably affect the smoothness of the cylindrical outer surface of the hub, at least some of the magnets may include a curved outer surface on the surface opposite the carrier plate 1904, to minimize the modulations. As depicted in FIG. 22, the magnets may be uniformly formed with a curved outer surface to avoid multiple different sizes of magnets being present in the axial array group. The curved outer surface of the magnets may contribute to the cylindrical outer surface of the rotor or stator hub being more uniformly smooth than when rectangular magnets are used.

Figure 23:
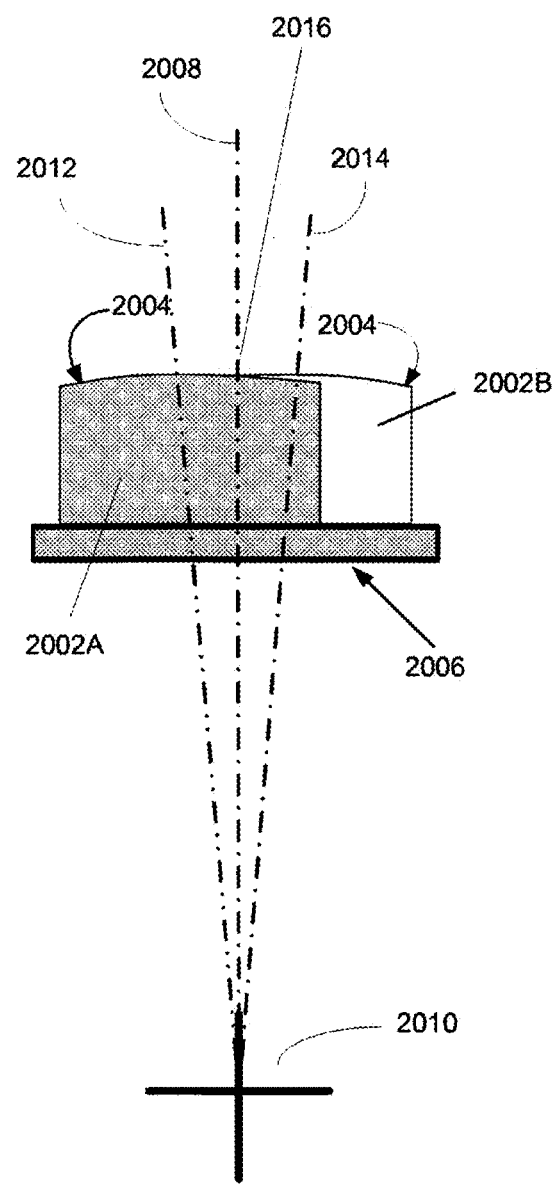
FIG. 23 is a side view example of a magnet mounted on a carrier plate as also illustrated in FIG. 22.

FIG. 23 is an example of a side view of a first magnet 2002A positioned in front of a second magnet 2002B, each having a respective curved outer surface 2004 opposite a carrier plate 2006. For illustrative purposes, an outline of the second magnet 2002B is shown behind the first magnet 2002A, which is shown in phantom in FIG. 23. The first and second magnets 2002A and 2002B may be positioned on the rotor or stator hub of FIG. 22. In FIG. 23, the curved outer surface 2004 of the magnets 2002A and 2002B may be obtained by, for example, grinding a squared outer surface magnet, or by forming the magnet 2002 to include the curved outer surface. In one example, the magnets 2002A and 2002B may be formed or machined to have the curved outer surface 2004 prior to being positioned on the carrier plate 2006 to form a magnet pole array. In this way when the magnets 2002A and 2002B are positioned on the carrier plate 2004 and mounted on the hub, they may form a portion of a more uniformly cylindrical outer surface of the rotor or stator hub due to the curved surfaces. Alternatively, in another example the magnets 2002A and 2002B may be positioned on the carrier plate 2006 to form a magnet pole array prior to being machined as an assembly or group to form the curved outer surface 2004 on the magnets 2002. Since the magnets 2002 have a curved outer surface 2004, the outer surface of the rotor may be uniformly cylindrical, and may be uniformly wrapped or banded to secure the magnets 2002A and 2002B, and the carrier plate 2016 to the hub.

In FIG. 23, a carrier plate centerline bisector 2008 extending from an axial centerline 2010 of the machine and intersecting with the carrier plate 2208 may be positioned between a first magnet centerline 2012 of the first magnet 2002A and a second magnet centerline 2014 of the second magnet 2002B. Thus, the first and second magnets 2002A and 2002B may be symmetric about the carrier plate centerline bisector 2008. A common central axis of the carrier plate 2006 may also be aligned with the carrier plate centerline bisector 2008. An arc center of the curved surfaces of each of the first and second magnets 2002A and 2002B may be coincident with the respective first and second magnet centerlines 2012 and 2014. Thus, a maximum height of the first and second magnets 2002A and 2002B may be at the respective magnet centerlines 2012 and 2014. In addition, the first and second magnet centerlines 2012 and 2014 may be offset from the carrier plate centerline bisector 2008 in opposite directions by half of the step offset distance. Since the first and second magnets 2002A and 2002B are of uniformly sized and shaped, the curved surfaces of the first and second magnets 2002A and 2002B may intersect at the carrier plate centerline bisector 2008 at a common point 2016. Since the magnets 2002A and 2002B are symmetrical, they may be interchangeably used at different positions in the magnet pole arrays.

Figure 24:
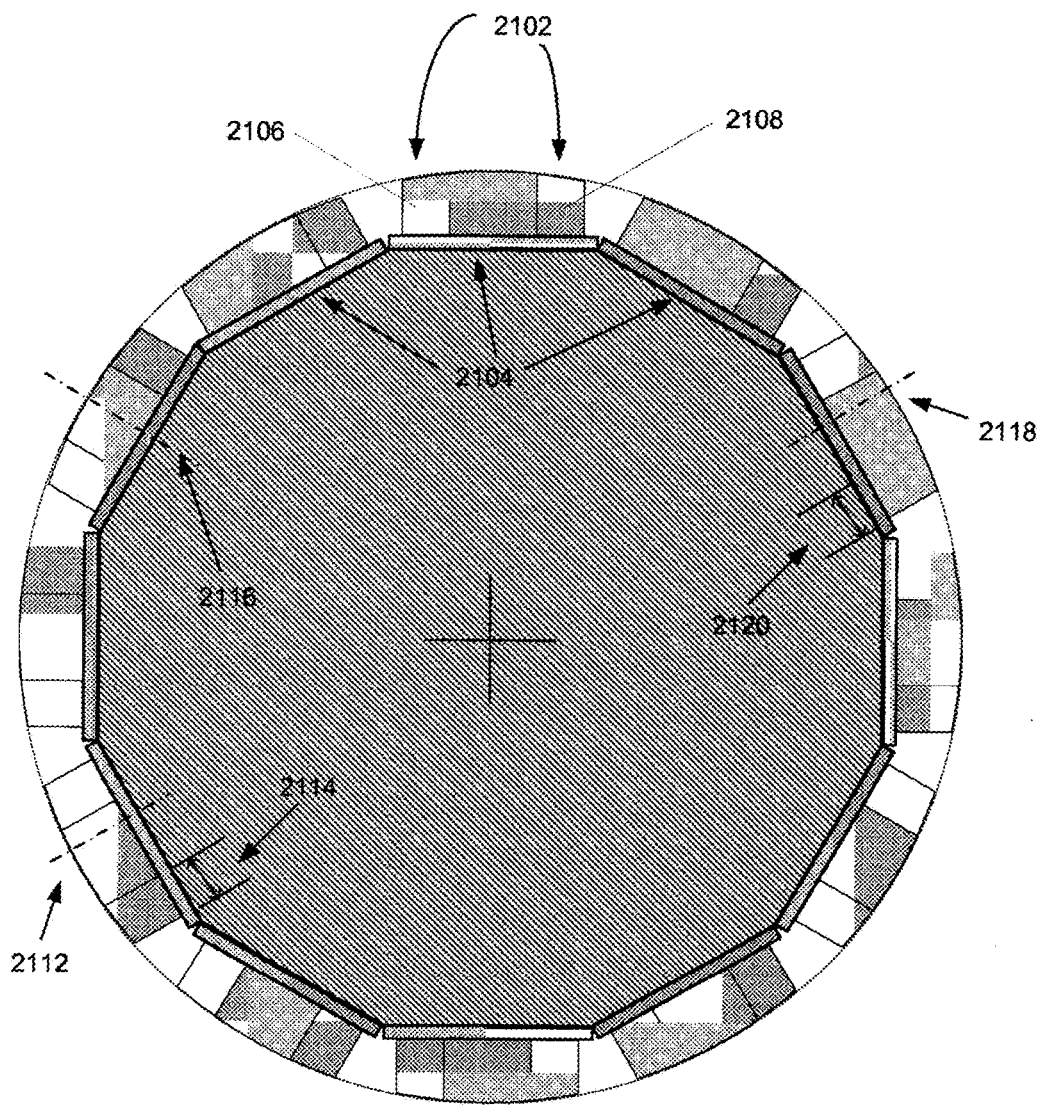
FIG. 24 is a cross-sectional view of another example rotor hub that includes carrier plates.

FIG. 24 is another example cutaway sectional view of a faceted rotor illustrating uniformly sized carrier plates 2104 having non-uniformly sized and/or shaped generally rectangular magnets. In this example, the magnets are formed in generally rectangular blocks that may not all be the same size, and at least some of the magnets may include a curved outer face 2102. In this configuration, the magnet array-carrier plate geometry produces a substantially cylindrical rotor surface when assembled using the multi-stepped configuration. The magnets in the magnet pole array may be different sizes, and may have different curved outer surface dimensions depending on their relative location in the magnet pole array.

In FIG. 24, for illustrative purposes, a 1st magnet pole array 2106 is illustrated in phantom so that a 2nd magnet pole array 2108 is fully visible. Similar to FIG. 22, the carrier plates of the first and fourth magnet pole arrays have a first step offset 2114 in the first direction and carrier plates of the second and third arrays have the second step offset 2120 in the second direction so that the magnet pole arrays in the axial array group are symmetrically positioned on the facet of the machine, to form a multi-stepped configuration. In this configuration, a central axis 2112 of the first and fourth magnet pole arrays may be offset in the first direction with respect to a common central axis 2116 of the respective carrier plate 2104. In addition, a central axis 2118 of the second and third magnet pole arrays may be offset in the second direction with respect to the common central axis 2116 of the respective carrier plate 2104. Thus, magnet arrays having magnets with a curved outer face can be aligned in an axial group array to not have a coincident central axis, and do not have to be aligned with the common central axis 2116 of the respective carrier plates 2104 due to the step offset used to form the multi-stepped configuration.

The present embodiments and discussion describe examples where the carrier plates are arranged on the facets of the hub uniformly to coincide with an axial centerline of machine. Thus, alignment with a common central axis of the carrier plates as discussed herein should be construed as also being aligned with the axial centerline of the machine based on a bisector line originating from the axial centerline of the machine that perpendicularly intersects each of the carrier plates. In other embodiments where the common central axes of the carrier plates are not perpendicularly aligned with a bisector line originating from the axial centerline of the machine, the various parts described herein should be construed as aligned with the axial centerline of the machine.

Figure 25:
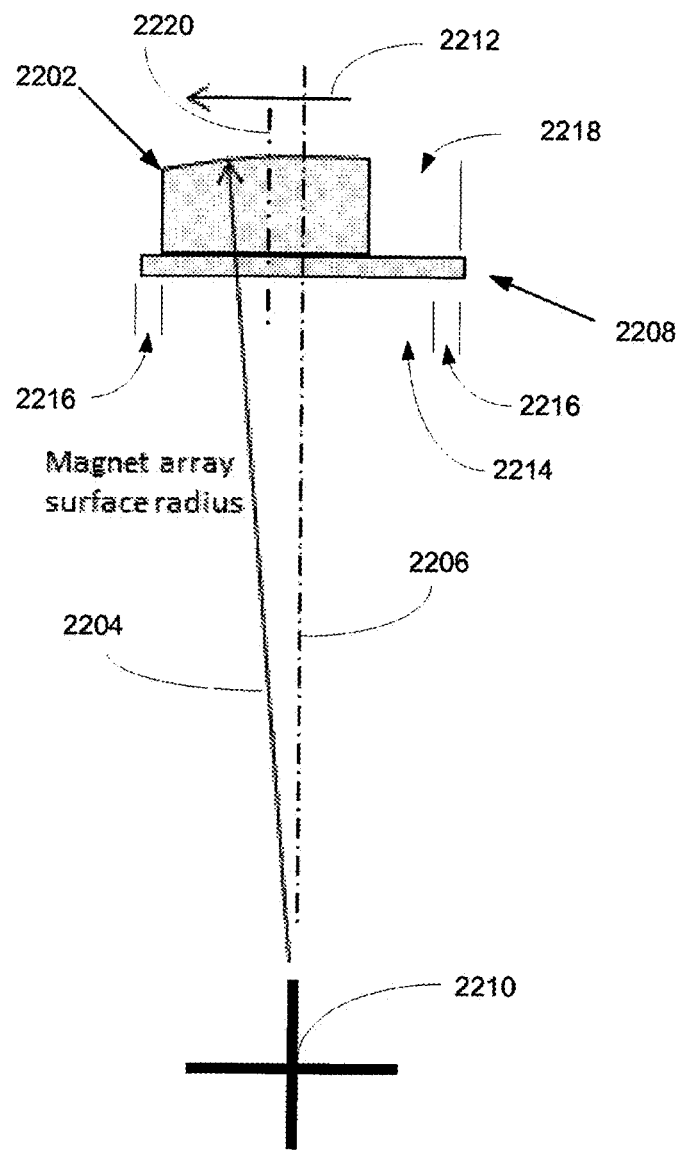
FIG. 25 is a side view example of a magnet mounted on a carrier plate with respect to an axial centerline of a rotor hub as also illustrated in FIG. 24.

FIG. 25 is an example of a magnet 2202 having a curved outer surface that may be included in a magnet array forming a magnet pole array as illustrated in FIG. 24. In the example of FIG. 25, an arc center 2204 of a surface radius of the magnet intersects a carrier plate perpendicular bisector line 2206, which may also be the common central axis of a carrier plate 2208 at an axial centerline 2210 of the machine, and the magnet 2202 is offset as illustrated by arrow 2212 by a step offset distance 2214 formed on the surface of the carrier plate 2206 so as to not be centered on the carrier plate 2208. In addition, an interpole space distance 2216 is present such that the magnet 2202 is spaced away from an edge of the carrier plate 2208 on one side by an interpole gap 2218 on the carrier plate 2208 that is the combination of the step offset distance 2214 and the interpole space distance 2216. The step offset distance is used to create the multi-step among the magnets 2202 in an axial array group. In addition, the magnet 2202 is adjacently positioned relatively close to an edge of the carrier plate 2208 on the opposite side, separated from the edge of the carrier plate 2208 by the interpole space distance 2216. In other examples, the interpole space may be omitted where additional manufacturing and assembly tolerances are unnecessary or undesired, as previously discussed. Thus, the magnet 2208 may be mounted on the carrier plate 2208 to be spaced away from a first edge of the carrier plate by the step offset distance 2214, and spaced away from an opposing edge of the carrier plate by a relatively small distance.

In the illustrate examples of FIGS. 24 and 25, the arc of the curved outer surface of the magnet 2202 is not symmetric such that the arc center 2204 of the magnet 2202 is not on a central axis 2220 of the magnet 2202. Thus, a maximum height of the magnet 2202 is spaced away from the central axis 2220 of the magnet 2202. Instead, the arc center 2204 may be coincident with the carrier plate perpendicular bisector line 2206 of the carrier plate 2208, or at some other location that provides a substantially uniform outer surface of the hub. This offset angle may be one half of the step angle so that the carrier plates are rotatable with common magnet sizes. In other examples, the arc of the curved outer surface of the magnet 2202 may be symmetric as depicted in FIG. 23.

Figure 26:
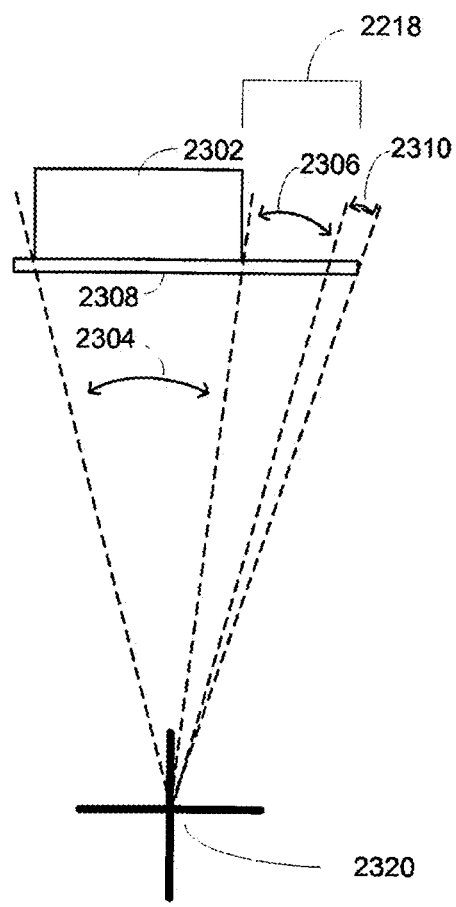
FIG. 26 is another side view example of a magnet mounted on a carrier plate with respect to an axial centerline of a rotor hub.

FIG. 26 is another perspective end view of an example carrier plate 2308 similar to those illustrated in FIGS. 23 and 25. In FIG. 26, the magnet 2302 is shown as occupying a portion of the carrier plate 2308, adjacent to the interpole gap 2218. A pole arc angle 2304, and a portion of a step angle 2306, such as ½ of the step angle, and an interpole gap angle 2310 on the carrier plate 2308 are also illustrated. Similar to FIGS. 23 and 25, the combination of the portion of the step angle distance 2214, and the interpole space distance 2216 define the width of the interpole gap 2218 on the carrier plate 2308. In addition, uniformly sized and shaped magnets 902 may be mounted on all of the plates 906 as illustrated in the example of FIG. 12 in which eight uniformly sized magnets are illustrated. Further, since the plates 906 are uniformly dimensioned, the plates 906 may be 23, the pole arc angle 2304 formed with respect to the axial centerline 2320 of the machine is typically greater than the portion of the step angle 2306, and the portion of the step angle 2306 is typically greater than the interpole gap angle 2310. The total angle that is the combination of the pole arc angle 2304, the portion of the step angle 2306, and the interpole gap angle 2310 may be equal to 360 degrees divided by the number of poles in the machine. In other examples, as previously discussed, the interpole space may be omitted and the magnet 2302 may be mounted on the carrier plate 2308 to be spaced away from a first edge of the carrier plate based on the step offset 2214, and spaced away from an opposing edge of the carrier plate by a relatively small distance.

Figure 27:
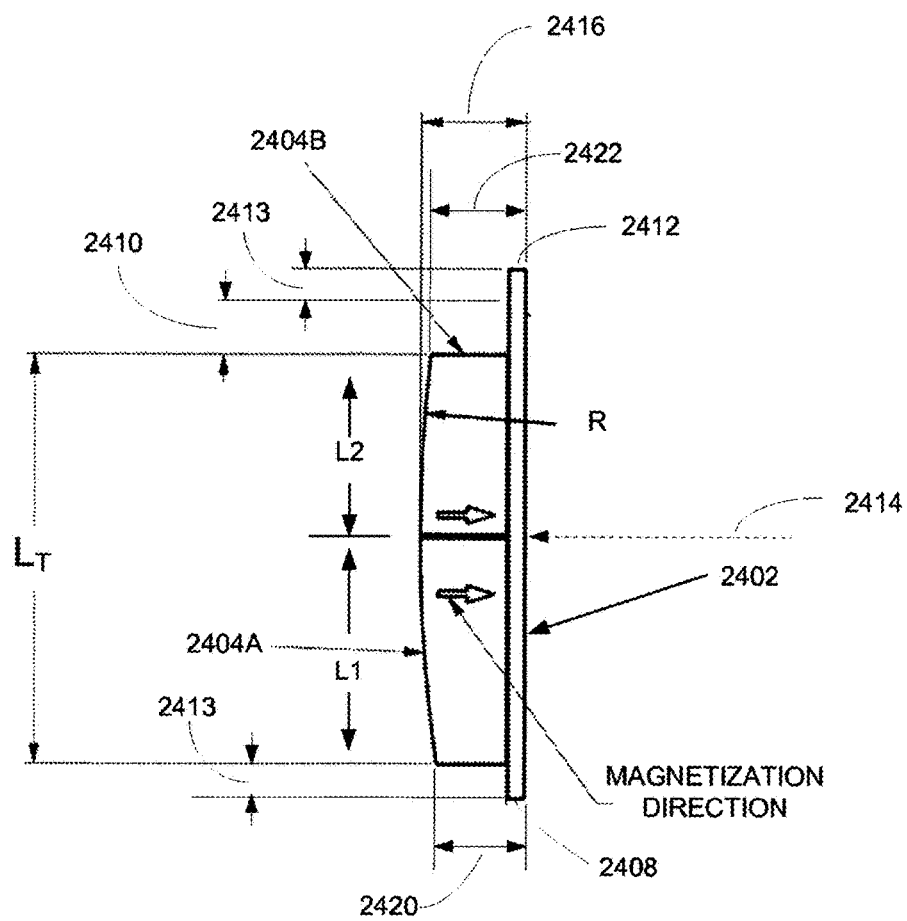
FIG. 27 is a side view example of an embodiment of a plurality of magnets mounted on a carrier plate.

FIG. 27 is a side view of an example carrier plate 2402 having two rows of magnets 2404 contained in a magnet pole array, instead of a single magnet as illustrated in FIGS. 23 and 25. Each of the magnets 2404 may have curved outer surfaces that form a contiguous radius of curvature. As illustrated in FIG. 27, a first magnet 2404A contained in a first row of the magnet pole array is positioned to be relatively close to a first edge 2408 of the carrier plate 2402. A second magnet 2404B contained in a second row of the magnet pole array is positioned adjacent a step offset 2410 formed on the surface of the carrier plate 2402, so that the second magnet 2404B is spaced away from a second edge 2412 of the carrier plate 2402 that is opposite the first edge 2408 by at least the step offset 2410. In some examples, between the step offset 2410 and the second edge 2412 may lie an interpole space 2413, which may also occur on the opposite side of the magnet 2404, as illustrated. The interpole space 2413 may allow for installation of the carrier plates on the surface of the hub, such as a stator or rotor hub, and may be omitted in some examples, as previously discussed. The second magnet 2404B and the first magnet 2404A each have a curved outer surface that cooperatively form a radius of curvature, which may be part of a substantially uniform cylindrical outer surface of the rotor or stator hub when all of the carrier plates 2402 are installed.

In order to achieve the substantially uniform cylindrical outer surface of the rotor or stator hub, the first row of magnets 2404 may be smaller in size relative to the second row of magnets 2404 due to the step offset configuration of the magnets on the carrier plates 2402. Specifically, a length L1 of the first magnet 2404A may be greater than a length L2 of the second magnet 2404B. The combination of the length of the first and second magnets 2404 may provide a total length $L_T$ of the magnet pole array, which can be, for example, 72.20 millimeters. In this example, each of the first and second magnets 2404A and 2404B may be 36 millimeters wide. The curved outer surface of each magnet 2404, which together form the radius of curvature may, in one example, be formed such that a midplane of the curved surface 2414, or centerpoint of the radius of curvature of the magnets 2404, is aligned with the common central axis, or centerline of the carrier plate, not the centerline of the combination of magnets 2404A and 2404B. The midplane of the curved surface 2414 of the radius of curvature of the magnets 2404 may be located where the curved surface of the magnets 2404 is furthest from the carrier plate 2402, at a maximum height 2416 of the magnet array. In this example, the point where the curved surface of the magnets 2404 is furthest from the carrier plate 2402 may also be the abutting peripheral edges of the respective magnets 2404A and 2404B such that both magnets 2404A and 2404B have substantially the same maximum height such as about 15.05 millimeters.

The first magnet 2404A and the second magnet 2404B may have a curve top surface based on a radius of curvature R. In one example, only the second magnet 2404B has a curved top surface, whereas in other examples, both the first and second magnets 2404 may have a curved top surface, which may be the same radius of curvature (R), or a different radius of curvature. In one example the radius of curvature based on the axial centerline of the machine may be a radius of 284 millimeters. Whether all or some part of the magnets have curved top surfaces may be based on a predetermined desired degree of smoothness of the cylindrical outer surface of the rotor and/or other parameters, such as the number of rows of magnets in the array. In any of these examples, the magnets 2404 may be separately manufactured parts, but the magnets 2404 may not be mechanically distinguishable. In other examples, where any number of rows of magnets 2404 may be included in the magnetic array, the magnets 2404 may be any combination of magnets, of differing lengths, with and without a curved top surface that is the same or different radii of curvature, resulting in any number of different magnet parts in order to achieve a desired substantially uniform cylindrical outer surface of the rotor or stator hub.

In FIG. 27, since the first and second magnets 2404 are different lengths, the overall dimensions of the magnets 2404 are different, but the magnets 2404A and 2404B may be of substantially the same maximum height at the maximum distance 2416 from the carrier plate 2412. Installation of the magnets 2404 in the magnet pole array may be in accordance with the different sizes. In one example, the magnet pole array may include a first row of magnets of a first predetermined length (L1) and a first radius of curvature (R1) of a top surface of the magnets, and a second row of magnets of a second predetermined length (L2) and a second radius of curvature (R2) of a top surface of the magnets, where R1=R2, and L1 and L2 are different, as illustrated, and previously discussed.

In order to maintain the substantially uniform cylindrical outer surface of the rotor hub or stator hub, the curvature of the top surface of the first magnet 2404A and the curvature of the second magnet 2404B may be the same. However, the height of the curved surface of the first and second magnets 2404A and 2404B with respect to distance from the carrier plate 2408 may be different at different locations along the respective curved top surfaces. As depicted in FIG. 24, the curved top surface of the first magnet 2404A may have a first predetermined height 2420 due to the difference in distance between the curved surface of the first magnet 2404A, and the carrier plate 2402 at an outer peripheral edge of the first magnet 2404A. In one example, this distance, or difference in height between the first predetermined height 2404A and the maximum height, such as 15.05 millimeters, is about 2.876 mm. The second magnet 2404B, on the other hand, may have a second predetermined height 2422 due to having a different distance between the curved surface of the second magnet 2404B and the carrier plate 2402 at an outer peripheral edge of the second magnet 2404A. In one example, the difference between the second predetermined height and the maximum height, such as 15.05 millimeters may be about 1.767 millimeters. The point where the curved surface of the respective magnets 2404A and 2404B are furthest from the carrier plate 2402 may also be the abutting peripheral edges of the respective magnets 2404A and 2404B, as depicted in FIG. 27. In examples with four, eight, or sixteen magnets in the magnet pole array, additional lengths and heights at different points along the radii of curvature are possible to achieve a substantially cylindrically uniform outer surface of the rotor while maintaining a symmetrical layout of the magnets on the carrier plate 2402.

The magnet assemblies containing the magnets 2404 are preferentially magnetized after assembly (and/or grinding the assembled plate if the curved outer face is used and not machined prior to assembly). Alternatively, the magnets 2404 may be magnetized before or during assembly. Although it may be more cumbersome of an assembly due to the magnetic fields of the magnets 2404, rectangular magnets, magnetized prior to assembly may allow a single part number for north (N) and south (S) magnet pole arrays in some examples. In these examples, there can still be a separate part number for N and S magnet assemblies in all cases, but they can be mechanically indistinguishable.

The magnet pole arrays can be placed on the rotor and the step angle can be achieved by rotating the assemblies of one step 180 degrees with respect to the other step in the axial array group. To achieve this, the magnets can be shifted on the carrier plate 2402 from the common central axis or centerline of the carrier plate 2402 by one half of the step angle. Use of either uniform sized magnets, or non-uniformed sized magnets, having a curved top surface allows for simplification of part numbers and much more rapid and repeatable bonding of the magnets 2404 to the rotor hub, while still allowing for whatever degree of magnet segmentation is dictated by the design.

The carrier plate 2404 can have through holes (for example one per corner or two on a side with the use of a clamping strip) to allow the carrier plates 2404 to be screwed into threaded holes on the rotor hub. The carrier plate 2404 can be assembled to the rotor or stator hub without fixturing or placement equipment by using long rods as guide tools. The rods may be coupled with the hub, such as by being threaded into the hub in two opposing corners. The carrier plate 2404 can be pushed by hand into alignment on the hub by following along the long rods. Once in position on the hub, the carrier plates 2404 may be fastened into place using the remaining fastener locations on the carrier plates 2404, while being maintained in the desired position by the threaded rods. For example, threaded fasteners may be used to screw down the carrier plate using the remaining holes not currently occupied by the rods. Once the carrier plate 2404 is fixedly connected with the hub, the rods may be removed and then replaced with mounting screws.

Figure 28:
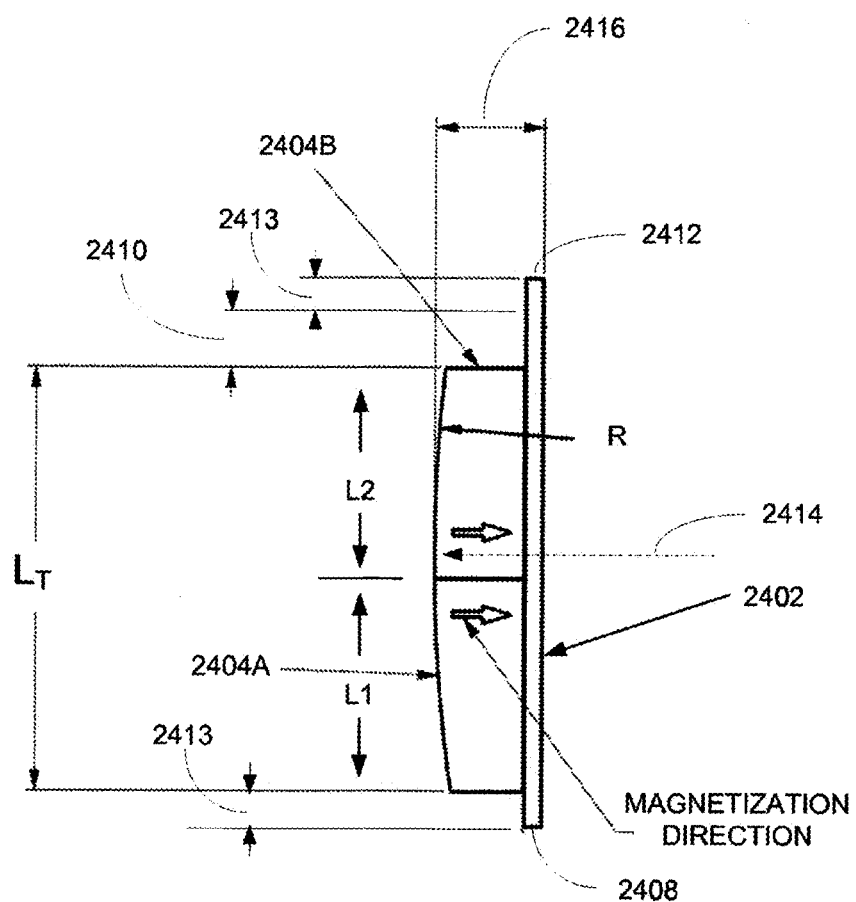
FIG. 28 is a side view example of another embodiment of a plurality of magnets mounted on a carrier plate.

FIG. 28 is another side view of an example carrier plate 2402 having two rows of magnets 2404 contained in a magnet pole array. In contrast to FIG. 27, in this example configuration, the length L1 of the first magnet 2404A may be substantially equal to the length L2 of the second magnet 2404B. As such, the midplane of the curved surface 2414 of the radius of curvature of the magnets 2404, which is located where the curved surface of the magnets 2404 is furthest from the carrier plate 2402 (at the maximum height), can be different due to the step offset 2410. For example, where the curvature, or radius (R), of the curved outer surfaces of the first and second magnets 2404A and 2404B are substantially the same, and the combination of the first and second magnets 2404A and 2404B result in the symmetrical magnet of FIG. 20, the first and second magnets 2404A and 2404B may each have the same maximum height at the abutting peripheral edges of the first and second magnets 2404A and 2404B similar to FIG. 27. Alternatively, in another example where the combination of the first and second magnets 2404A and 2404B result in the unsymmetrical magnet of FIG. 25, the maximum heights of the two magnets may be different. As a result, the maximum height may be on the second magnet 2404B, for example, instead of coincident with the abutting peripheral edges of the respective magnets 2404 as depicted in FIG. 27 due to the step offset 2410. In the example of FIG. 28, the midplane of the curved surface 2414, or centerpoint of the radius of curvature of the magnets 2404, is illustrated as being located on the second magnet 2404B.

Figure 29:
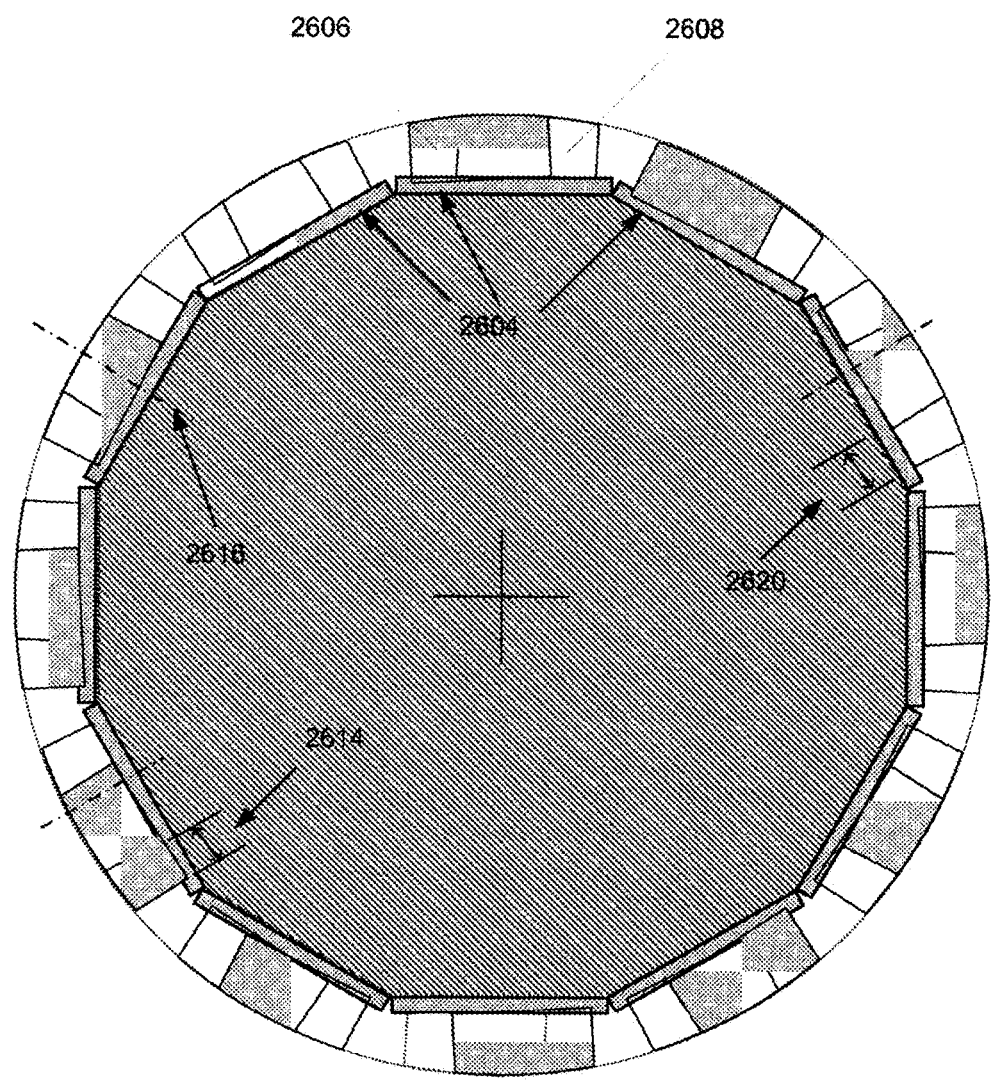
FIG. 29 is a cross-sectional view of another example rotor hub that includes carrier plates having a beveled surface.

FIG. 29 is another example cutaway sectional view of the faceted rotor of FIG. 4 illustrating uniformly sized carrier plates 2604 having rectangular magnets mounted thereon. In this example, the magnets may be formed in rectangular blocks of uniform size, or may be formed with a curved outer face and be of different lengths, as previously discussed. In FIG. 29, for illustrative purposes, a 1st magnet pole array 2606 is illustrated in phantom so that a 2.sup.nd magnet pole array 2608 is fully visible. Similar to the other examples, the first and fourth magnet pole arrays have a step offset 2614 in the surface of the carrier plates 2604 in the first direction with respect to a common central axis 2616 of the carrier plates 2604. In addition, the second and third arrays have a step offset 2620 in the surface of the carrier plates 2604 in the second direction with respect to a common central axis 2616 of the carrier plates 2604, so that the magnet pole arrays in the axial array group are symmetrically positioned about the common axis of the carrier plates 2604, as previously discussed.

The example faceted rotor of FIG. 29 uses an array of magnets mounted on a beveled carrier plate 2604 that is bonded to the faceted rotor to implement the multi-stepped magnet configuration. The carrier plate 2604 may be beveled such that magnets create a more uniform outer surface of the rotor or stator hub when the magnet array-carrier plate geometry is installed to produce a substantially cylindrical rotor surface. In one example, the magnets may be uniform size and shape throughout the magnet pole array, similar to the example of FIGS. 22 and 23. Thus, the arrangement between the carrier plates and the magnets in the magnet pole array may be such that a common assembled part containing the magnets and the carrier plate 2606 can be used for each step offset, and any bolt holes on the hub may be on a line parallel with the axis of rotation (requiring no indexing from step offset position to step offset position).

Alternatively, or in addition, the magnet assemblies may be formed from rectangular blocks, mounted as a magnet pole array on a carrier plate, and then machined as an assembly to have a curved outer face as previously discussed with reference to FIGS. 22-28. Alternatively, the magnet pole array mounted on the carrier plate may be formed from a single part magnet having a curved outer face.

Figure 30:
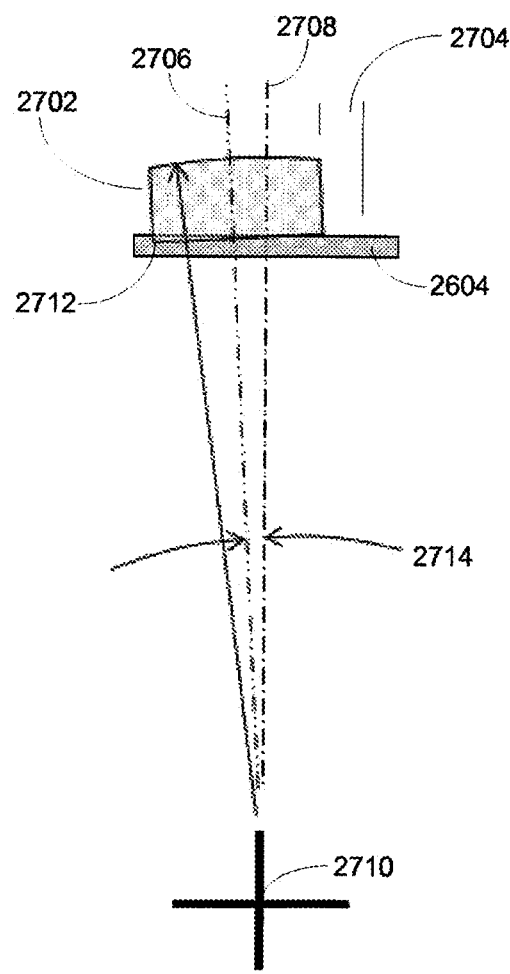
FIG. 30 is a side view example of a magnet mounted on a carrier plate with respect to an axial centerline of the rotor hub of FIG. 27.

FIG. 27 is an example of a magnet 2702 having a curved outer surface that is mounted on a beveled carrier plate 2404. In the example of FIG. 30, the magnet array can be uniformly positioned on the beveled carrier plate 2404 with a step offset 2704 in the surface of the carrier plate 2404. Similar to FIG. 25, due to the curved outer surface of the magnet 2702, a midplane of the curved surface 2706, or centerpoint of a radius of curvature, of a surface of the magnet 2702 intersects a carrier plate perpendicular bisector line 2708 or common central axis 2708 of the carrier plate 2604 at an axial centerline 2710 of the machine. In FIG. 27, the midplane of the curved surface 2706 of the magnet 2702 is additionally offset from the common central axis 2708 of the carrier plate 2604 by a beveled surface 2712.

The beveled surface 2712 may be created or formed as a cut in the carrier plate 2404 to receive at least some of the magnets 2702 in the array. In addition to forming a substantially cylindrical surface of the rotor or stator, the beveled surface 2712 may also be used in creating the step angle used in the multi-stepped configuration. As illustrated in FIG. 30, the magnets in the magnet array may be rotated about the rotor center by a magnet rotation angle 2714 due to being positioned on the beveled surface 2712. The magnet rotation angle 2714 may be half of the desired step angle with respect to the common central axis 2708 of the carrier plate 2604. Accordingly, due to the rotation of the magnets 2702, and the corresponding shift in the midplane of the curved surface 2706, a portion of the step angle 206 (FIG. 5) may be achieved with the beveled surface 2712, thereby allowing a lesser distance between the array axes of an axial array group, such as the first and second array axes 202 and 204 of the axial array group 206 of FIG. 5. The net assembly creates the desired step angle and still produces a substantially cylindrical rotor surface.

The beveled surface 2712 of the carrier plate 2604 can be determined from the rotor geometry and desired step angle to allow the centerline for the outer face of the rotor or stator hub to be common between different steps. In this way there can be separate parts and corresponding part numbers for N and S magnet assemblies mounted on substantially identical carrier plates 2404 in all cases, making them mechanically indistinguishable. Similar to the previous examples, the magnet assemblies mounted on the carrier plates 2604 can be placed on the rotor or stator hub and the step angle can be achieved by rotating the carrier plates 2604 180 degrees with respect to another of the carrier plates 2604 in the same axial array group.

Figure 31:
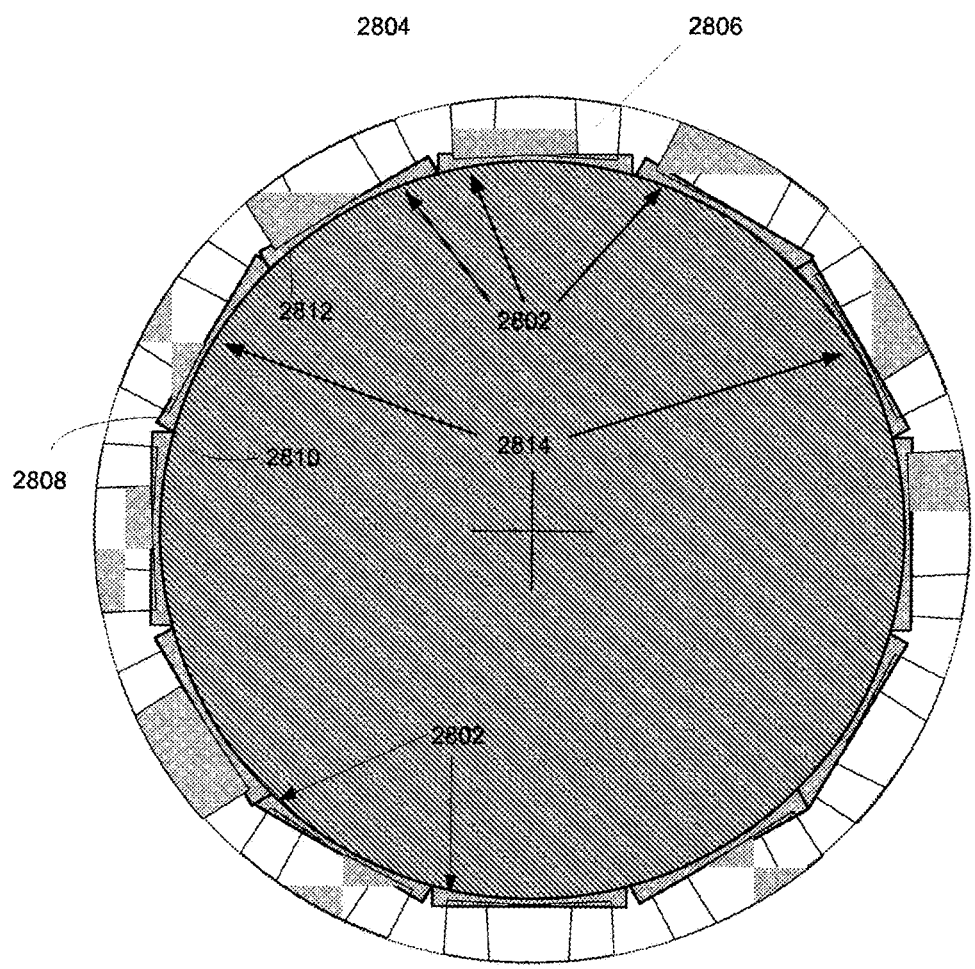
FIG. 31 is a cross-sectional view of another example rotor hub that includes carrier plates having a radius of curvature.

FIG. 31 is an example cutaway sectional view of a round rotor or stator 2800. The round rotor or stator hub 2800 is different from the previously discussed faceted rotor or stator hub designs. The round rotor or stator hub 2800 includes magnet assemblies for round rotors using non-flat carrier plates 2802. The round rotor of FIG. 31 may include uniformly sized carrier plates 2802 and magnets, to minimize part count, as previously discussed. In FIG. 31, for illustrative purposes, a 1st magnet pole array 2804 is illustrated in phantom so that a 2nd magnet pole array 2806 included in the axial array group is fully visible. In this example, the magnets may be formed in rectangular blocks of uniform size such that there is a uniform part for all magnets, or may be formed with a curved outer face and be of different lengths, such that there are at least two standard parts for the magnets in the magnet pole arrays 2804 and 2806. In the example of an axial array group that includes four magnet pole arrays, as in the previously discussed examples, first and fourth outer magnet pole arrays may have a step offset in a first direction and second and third inner magnet pole arrays may have the step offset in the second direction so that the magnet pole arrays in the axial array group are symmetrically aligned along the center step axis The carrier plates 2802 may include a first surface 2808 upon which the magnets may be mounted, and a second surface 2810 which may be positioned against the rotor or stator hub when the carrier plate 2802 is installed thereon. The first surface 2808 of the carrier plates 2802 may be a relatively flat planar surface, and the magnets may be rectangular blocks of uniform size, or may have a curved outer surface, as previously discussed. Alternatively, or in addition, the first surface of the carrier plates 2802 may be beveled 2812, as in the example of FIGS. 29 and 30. In addition, to accommodate the round rotor or stator hub configuration, the second surface 2810 of the carrier plates 2802 may be warped, machined, or otherwise altered such that a radius of curvature 2814 of the second side 2810 of the carrier plates 2802 substantially match the radius of curvature of the outer diameter of the rotor or stator hub on which the carrier plates 2802 are mounted.

The previously discussed example configurations of carrier plates and magnets for permanent magnet machines provide flexibility and efficiency in creating multi-step designs. The multi-step configuration may be created in any of various configurations using magnet assemblies strategically mounted on the carrier plates. Since the carrier plates and respective magnet assemblies may be made uniformly and are readily interchangeable among different positions on a rotor or stator hub, part counts are minimized. In addition, installation of the magnet assemblies on the rotor or stator hub may be performed efficiently due to the magnet assemblies all being on uniformly sized and shaped carrier plates.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:
1. An electric machine comprising:
a rotor;

a stator surrounding the rotor, the stator having tooth tips with a bifurcated profile which increases apparent frequency of tooth ripple flux and decreases amplitude;

a hub having an axial centerline and an array centerline;

a plurality of carrier plates of uniform size mounted on the hub, each carrier plate having a common central axis, a surface and one or more edges, the carrier plates being arranged sequentially to align the common central axis of the carrier plates; and a plurality of permanent magnets mounted on each of the carrier plates, the permanent magnets mounted on a respective carrier plate proximate a first edge of the respective carrier plate and spaced away from a second edge of the respective carrier plate, the permanent magnets being spaced away from the second edge to form an axial step offset on the surface of the respective carrier plates, the permanent magnets being mounted on the carrier plates to form one or more axial group arrays such that the axial step offset aligns with the common central axis and is symmetric about the array centerline;

wherein at least one spacer mounted to the carrier plate is used to create a radial step offset of the permanent magnets mounted on each of the carrier plates of a single axial array group with adjacent carrier plates stepped sequentially such that the radial step offset aligns with the common central axis and is symmetric about the array centerline;

wherein the tooth ripple flux harmonics from the one or more axial group arrays on either side of the array centerline are decoupled from the rotor.

2. The electric machine of claim 1, wherein at least some of the permanent magnets mounted on the respective carrier plate include a flat surface in contact, with the respective carrier plate, and a curved surface opposite the flat surface.

3. The electric machine of claim 2, wherein each of the permanent magnets mounted on the respective carrier plate are positioned so the curved surface of respective permanent magnets cooperatively form a substantially uniform radius of curvature.

4. The electric machine of claim 1, wherein the hub includes a faceted surface, and a flat surface of each of the carrier plates that is opposite the permanent magnets is in contact with respective facets of the faceted surface.

5. The electric machine of claim 1, where the hub is formed to be substantially round and have a predetermined radius of curvature, and each of the carrier plates includes a surface having the predetermined radius of curvature and being in contact with hub, the surface of each of the carrier plates having the predetermined radius of curvature being opposite a surface of each of the carrier plates upon which permanent magnets are uniformly mounted.

6. The electric machine of claim 1, wherein each of the carrier plates are coupled with the hub using a plurality of fasteners, the hub formed to include a plurality of apertures formed to receive and couple with the fasteners, the apertures aligned sequentially in rows along the axial centerline of the hub.

7. The electric machine of claim 6, wherein each of the carrier plates include through holes formed to receive a respective fastener.

8. The electric machine of claim 6, wherein at least some of the fasteners commonly hold a plurality of carrier plates rigidly against a surface of the hub.

9. An electric machine comprising:

an armature having a plurality of armature teeth separated by slot openings, each of the armature teeth having at least two bifurcations equally spaced across a respective armature tooth such that a first bifurcation angle between two bifurcations on a first armature tooth differs from a second bifurcation angle on a second armature tooth that is adjacent to the first armature tooth;

a main field having a first end and a second end and a plurality of permanent magnets mounted on the main field to form an axial array group in which the permanent magnets are positioned with respect to each other based on the position of the at least one bifurcation and the slot openings, the permanent magnets positioned such that magnetic pole arrays in the axial array group are step offset from one another to form a multi-stepped configuration, a first and second one of the permanent magnets being positioned on the main field in a first position, and a third and fourth one of the permanent magnets being positioned in a second position on the main field that is offset from the first position, a predetermined step angle formed between the first and third permanent magnets and between the second and fourth permanent magnets; and a carrier plate having predetermined dimensions, and wherein each of the plurality of permanent magnets are mounted on a respective carrier plate having the predetermined dimensions, each carrier plate being rotatable to a first position to align the permanent magnets on the carrier plate with a first axis and rotatable to a second position to align the permanent magnets in the second position with a center axis;

wherein the axial array group comprises a plurality of magnet pole arrays, each of the magnet pole arrays mounted on a plate that is detachably mounted on the main field;

wherein the permanent magnets are mounted to the carrier plates in a manner such that there is a step offset in both the axial and radial direction successively for each adjacently mounted magnet pole array;

wherein axial components of tooth ripple induced force vectors cancel each other between the ends of the main field.

10. The electric machine of claim 9, wherein a first group of the permanent magnets included in the axial array group are positioned along a first axis on the main field, and a second group of permanent magnets are positioned along a second axis of the main field, the first axis and the second axis being parallel with an axial centerline of the main field, and being at different locations around the circumference of the main field.

11. The electric machine of claim 10, wherein a first plane intersecting the first axis and the axial centerline and a second plane intersecting the second axis and the axial centerline form a predetermined angle.

12. The electric machine of claim 11, wherein the predetermined angle is determined based on a armature tooth bifurcation and an armature slot position.

13. The electric machine of claim 9, wherein the permanent magnets forming the axial array group are positioned symmetrically with respect to an array centerline of the electric machine that is perpendicular to an axial centerline of the electric machine, and are also symmetric with respect to a center step axis that is parallel to the axial centerline of the electric machine.

14. The electric machine of claim 9, wherein the first and third permanent magnets are symmetrically positioned on the main field with respect to an axial centerline, and the second and fourth permanent magnets are symmetrically positioned with respect to the axial centerline, and all of the first, second, third and fourth permanent magnets are symmetrical positioned on the main field with respect to an array centerline of the main field.

15. An electric machine comprising:
    a plurality of bifurcated teeth positioned circumferentially on an armature included in the electric machine to form a plurality of slots, each of the bifurcated teeth comprising at least one bifurcation, the teeth being arranged such that the bifurcations are unequally distributed around the armature with respect to each other and have equal bifurcation angles;
    a plurality of magnets positioned axially on a main field included in the electric machine to form an axial array group along a center step axis that is parallel to an axial centerline of the electric machine, the main field having a first end and a second end; and
    a first group of the plurality of magnets offset from the center step axis in a first direction, and a second group of the plurality of magnets offset from the center step axis in an opposite direction, wherein an axial and radial offset of the first and second groups of magnets is based on a relative position of the bifurcated teeth and the slots with respect to the first and second groups of magnets such that magnetic pole arrays in the axial array group are both axially and radially step offset from one another to form a multi-stepped configuration, a first and second one of the permanent magnets being positioned on the main field in a first position, and a third and fourth one of the permanent magnets being positioned in a second position on the main field that is offset from the first position, a predetermined step angle formed between the first and third permanent magnets and between the second and fourth permanent magnets; and
    a carrier plate having predetermined dimensions, and wherein each of the plurality of permanent magnets are mounted on a respective carrier plate having the predetermined dimensions, each carrier plate being rotatable to a first position to align the permanent magnets on the carrier plate with a first axis and rotatable to a second position to align the permanent magnets in the second position with a center axis;
    wherein axial components of tooth ripple induced force vectors cancel each other between the ends of the main field.

16. The electric machine of claim 15, where the first group of the plurality of magnets includes at least two magnets that are positioned on the main field with at least part of the second group of magnets therebetween.

17. The electric machine of claim 15, wherein the carrier plate includes a magnet pole array formed from at least two of the magnets.

18. The electric machine of claim 15, wherein the main field is included on a rotor of the electric machine and the armature is included on a stator of the electric machine.

19. The electric machine of claim 15, wherein the at least one bifurcation is formed on each of the bifurcated teeth with at least one of a width and a depth that are substantially equal to a size of a slot opening formed between bifurcated teeth that are adjacently positioned on the armature.

20. The electric machine of claim 15 wherein the carrier plate includes a magnet pole array formed from at least two of the magnets, and at least one of the at least two magnets include a chamfered edge to form a leading or trailing edge of the magnet pole array.

* * * * *